US005826735A

United States Patent [19]

Litten

[11] Patent Number: 5,826,735

[45] Date of Patent: Oct. 27, 1998

[54] RAILCAR CUSHION DEVICE VALVING SYSTEMS

[75] Inventor: Glen L. Litten, Springfield, Oreg.

[73] Assignee: Emerald Rail Technologies, LLC, Springfield, Oreg.

[21] Appl. No.: 744,493

[22] Filed: Nov. 12, 1996

Related U.S. Application Data

[63] Continuation-in-part of Ser. No. 692,172, Aug. 5, 1996, and a continuation-in-part of Ser. No. 714,550, Sep. 16, 1996.

[51] Int. Cl.[6] ........ B61G 9/16

[52] U.S. Cl. ........ 213/43; 188/287; 188/322.13; 137/514.7

[58] Field of Search ........ 213/7, 8, 43; 188/269, 188/287, 312, 315, 322.13; 137/514, 514.5, 514.7

[56] References Cited

U.S. PATENT DOCUMENTS

| | | | |
|---|---|---|---|
| 3,621,875 | 11/1971 | Alexander | 137/514 |
| 3,797,673 | 3/1974 | Daugherty, Jr. | 213/8 |
| 5,325,700 | 7/1994 | Litten | 73/11.06 |
| 5,415,303 | 5/1995 | Hodges et al. | 213/43 |
| 5,487,480 | 1/1996 | Page et al. | 213/43 |
| 5,603,348 | 2/1997 | Geringer | 137/514.7 |
| 5,642,823 | 7/1997 | Kalina et al. | 213/43 |

*Primary Examiner*—S. Joseph Morano

*Attorney, Agent, or Firm*—Klarquist Sparkman Campbell Leigh & Whinston

[57] ABSTRACT

A valving system for a rail car cushion device including several pressure control relief sequence valves (PCRS) mounted in the cylinder wall of the cushion device each having hydraulic biasing applied to retain a valve piston against a seat until a preload pressure is reached, with one or more optional spike control (SC) valves mounted in a cushion device piston head.

14 Claims, 13 Drawing Sheets

100 1 104 1 105 101 102 103 106

1
10
28
14
13
36
38
21
12
25
27
31
16
26
17
18
22
23
20
15
19
30
40
24

27
10
25
42
18
25
19
41
44
39
29
17
16
26
28
35
37
13
31
36
30
34
32
33
40
38
12
24
43

17
16
26
50
18
10
27
25
22
14
23
28
20
13
15
19
21
12
24

13
44
48
33
32
45
46
47
36
30
31
37
35

30
33
32
45
46
47
36

12
40
43
24
38

10
16
27
25
25
23
14
22
28
26
13
38
12
21
34
24
3

10
16
27
25
25
23
14
22
28
13
38
12
21
34
24
3

110
209
207
206
201
111
202
204
202
205
208

111
PRELOAD VALVE
(PRIOR ART)
110
200
202

RAILCAR CUSHION DEVICE VALVING SYSTEMS

This is a continuation-in-part of co-pending U.S. application Ser. Nos. 08/692,172 filed Aug. 5, 1996 pending and 08/714,550, filed Sep. 16, 1996 pending.

FIELD OF THE INVENTION

The invention relates generally to gas-charged hydraulic cushion units that are used to absorb shock impacts between railroad cars during collisions, and in particular to cushion unit hydraulic valving systems and improved cushion devices.

BACKGROUND OF THE INVENTION

Non-linear hydraulic shock absorbers are used in railroad cars to minimize damage from bumping and collisions and the units are referred to as cushion devices. During a 14 mile per hour collision between rolling stock weighing 220,000 pounds shock forces transferred through couplers to cushion devices can reach more than one million pounds in milliseconds and cause a rise in hydraulic fluid pressure to peak values of more than 190,000 pounds per square inch (psi). While it is necessary to rapidly release hydraulic fluid pressures in a cushion unit during high speed collisions to prevent explosive failure, at lower speeds pressures build more slowly and if they are released too rapidly the railcar or its cargo can be damaged. The very high peak pressures and short times, combined with a wide range of operational shock absorbing needs create special engineering challenges. This is particularly true during transit where train action between railcars drafting one-another exerts sufficient force to break heavy webbed restraining straps (e.g. on equipment and automobiles).

Typically rail car cushion devices are mounted into sills that are welded into the frames of rail cars (e.g., as disclosed in U.S. Pat. No. 5,325,700), and they are filled with pressurized hydraulic fluid. Cushion devices are designed to absorb impact forces applied to a railcar coupler. Following an impact, movement of a piston in the cushion device express hydraulic fluid through apertures spaced along the side walls of a cylinder. The cylinder is enclosed within a casing and an annular space between the cylinder and casing collects the expressed hydraulic fluid until pressure drops and it can be recycled into the cylinder through a series of heavy duty one-way ball valves. A variable shock absorbing action is possible, because as the piston traverses the cylinder it progressively closes apertures leaving fewer and fewer open to relieve pressure. By varying the spacing of apertures along the cylinder wall an attempt has been made to create a device capable of providing different resistive forces at different positions in the piston stroke. Unfortunately existing cushion devices are not able to eliminate damage to cargoes and cars, partly because the forces applied to railcars during railroad operations, and collisions are not necessarily linear, constant or predictable with respect to time. Return of the cushion device piston to its original position was, once accomplished by spring, but now is more commonly achieved hydraulically by charging the cushion device with nitrogen gas to a pressure of about 400 to 800 psi. Charging with gas at this pressure is also aimed toward provides about 20,000 to 40,000 pound "preload" resistive force in a cushion device having an 8 inch piston diameter. Typical cushion devices in the art suffer from the disadvantages of being unable to prevent damage to railcars and cargo, because the designs, at the same time, offer too little or too much resistive force, depending upon the speed of collision, mass of the cars involved in the collision, and the position of the individual cushion device pistons along their stroke at the time of the collision. In addition, most existing cushion devices have poor "slack action" performance, i.e., as railcars bounce against one another during on-road drafting. As a result many cargoes cannot presently be shipped by rail.

Rail car collisions commonly occur at a variety of different speeds and involving different loads. Common rail car gas charged cushion devices cylinders and pistons range in diameter from 6 to 11 inches with strokes of 6 to 20 inches. The common units must currently accommodate all the different types of shock absorbing requirements encountered in normal railroad operations.

Fluid dynamics in a gas-charged hydraulic railcar cushion device are complex; vary with operating conditions; and are difficult to theoretically model because performance is related to factors such as the area of the cushion device piston; stroke; volume of hydraulic fluid; pressure of gas; temperature friction; fluid viscosity; collision rate; rail car mass; position of a piston along its stroke and position of apertures along the cylinder wall.

In an apparent attempt to reduce railcar and cargo damage and derailments running into the millions of dollars per year, the Association of American Railroads (AAR) issued circular letters in 1995 to solicit comments for proposed revisions to AAR Specifications M-921B-93 and M-921D-93 (Section B of the Manual of Standards and Recommended Practices) directed to "end-of-car-cushioning units having preload action". Draft specifications "M-921B-96" and "M-921D-96" were issued in 1996. According to the new specifications, all future railcar cushion devices are to have (i) preloading to establish a minimum resistive force of either 50,000 pounds (M-921D-96) or 100,000 pounds (M-921B-96); (ii) restoring mechanisms to return a piston to its fully extended position within 60–120 seconds; (iii) impact resistance at collision speeds of up to 10 miles per hour (MPH; M-921D-96) or 14 MPH (M-921B-96); and (iv) performance more compatible (than previously) with train actions during transit.

It is an object of the invention to provide valving systems and improved railcar cushion device units capable of achieving AAR certification under M-921B-96 and M-921D-96, with improved performance and fewer compromises in absorbing shock under the range of train action operating conditions.

SUMMARY OF THE INVENTION

Disclosed herein are valving systems for installation in the cylinder wall and piston of rail car cushion devices providing means for achieving qualifying test performance under M-921B-96 and/or M-921D-96. The disclosed valving systems do not rely on pressure relief valves, or metering valves, but instead use hydraulic biasing in a pilot-controlled relief sequence (PCRS) valve and spike-control (SC) valve.

Investigations of high pressure hydraulic fluid flow through a small 1-inch diameter piston-type hydraulically biased pilot valve at pressures up to thousands of pounds per square inch eventually resulted in PCRS valve designs for rapidly and cleanly releasing very high peak hydraulic pressures in railcar cushion devices without valve chatter, turbulence or failure. Investigations of high velocity impacts (i.e., in excess of 10–14 MPH) between railcars weighing 150,000–263,000 pounds discovered spikes in excess of 1.75 million pounds which occurred in less than 1.7 microseconds; only the tails of which were captured using electronic monitoring equipment. The discovery provided incentive for development of an SC valve capable of responding within microseconds and releasing a pre-set volume of hydraulic oil sufficient to eliminate spike pressure forces.

PCRS valves are installed at different pre-selected positions within the cylinder wall of a cushion device to achieve optimal ¼-buff, ¾-buff, and slack-action performance according to AAR standards. SC valves are installed at different positions radially about the face of a cushion device piston.

The disclosed preload valving systems offer the advantage of providing shock absorbing capacity in collisions at low mass and low velocity, as well as at a high mass and high velocity. In railcar tests performed according to AAR inspectors, the PCRS valving system installed in retrofitted (i.e., 'improved') cushion devices achieved qualifying test performance and certification under both M-921B-96 and M-921D-96. The functioning of the disclosed PCRS and SC valves is dependent upon hydraulic principles and offers cushion devices having improved performance and reliability.

DETAILED DESCRIPTION OF THE PREFERRED EMBODIMENTS

The Association of American Railroads draft specifications M-921B-96 and M-921D-96 are incorporated herein by reference and set forth, in part, in Appendices A and B, below at page 37.

At used herein the following terms are intended to have meaning as follows: namely, "Cushion device unit" is intended to mean a gas charged, or spring returnable, hydraulic railcar shock absorber unit. Cushion devices are known in the art and one representative example is disclosed in U.S. Pat. No. 5,325,700, incorporated herein by reference. Commonly, cushion device units have cylinder (and piston) diameters of about 6 inches to about 11 inches with strokes of about 6 to about 20 inches.

Figure 1:
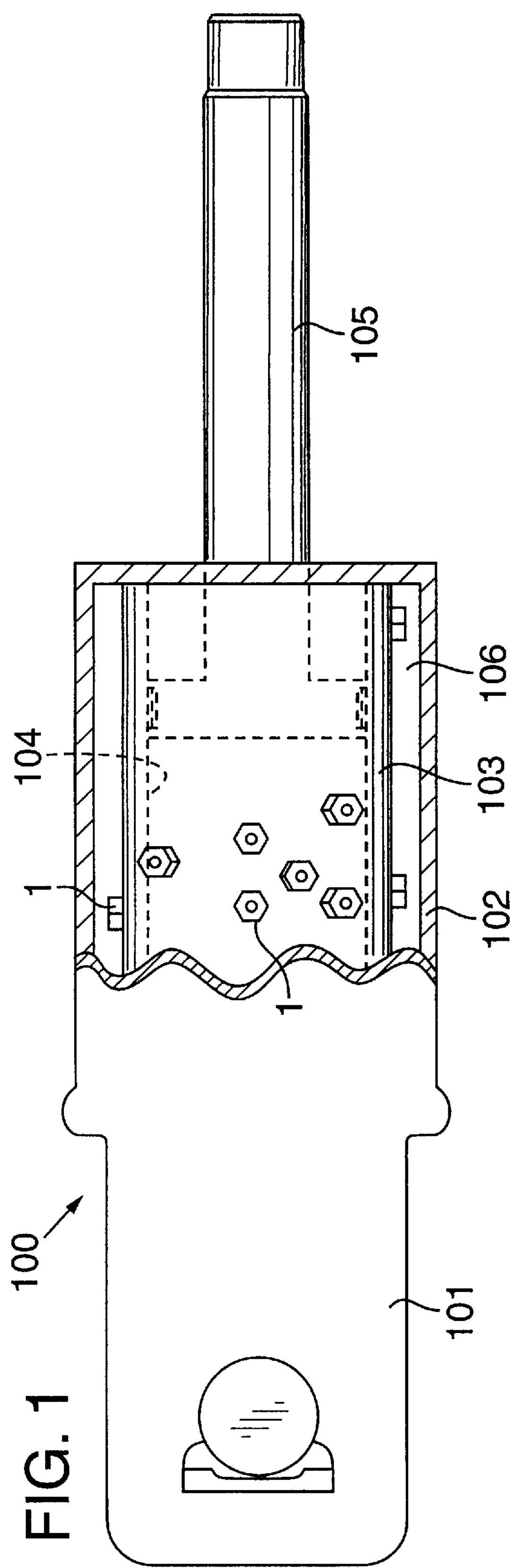
FIG. 1 depicts in a cutaway plan view an improved railcar cushion device fitted with PCRS valves according to the accompanying disclosure, below.

"Preload" is intended to mean that the instant valving means has both an "closed" mode and a "open" mode and that the transition from the closed mode to the open mode occurs at a "predetermined preset pressure value" of the hydraulic fluid within the cylinder of the hydraulic gas charged cushion device. In the closed position hydraulic fluid is retained within the hydraulic cushion device cylinder and cannot exit through the instant valving means. In the open position, hydraulic fluid within the hydraulic cushion device cylinder can exit through the instant valving means into the circumferential annular space afforded between the casing and the cylinder (FIG. 1, as disclosed below). In a presently preferred embodiment the "predetermined pressure" at which transition from the closed to the open mode occurs is either about 50,000 psi, i.e., according to AAR M-921D-96, or is about 100,000 psi, i.e., according to AAR M-921B-96, for a cushion device having a piston diameter of about 8 to about 10 inches in diameter.

"Closed mode" is intended to mean that the instant PCRS valve, when in this mode, does not allow hydraulic fluid to pass through its housing from the cushion device cylinder bore into the cushion device circumferential annular space.

"Open mode" is intended to mean that the instant PCRS valve, when in this mode, allows hydraulic fluid to pass through its housing from the cushion device cylinder bore into the cushion device circumferential annular space.

"Shock damping" is intended to mean the resistive force applied to a cushion device piston when a PCRS valve is in a closed mode, as defined above.

"Shock absorption" is intended to mean the resistive force applied to a cushion device piston when a PCRS valve is in an open mode, as defined above.

"Valve chatter" is intended to mean repetitive rapid opening and closing of a PCRS valve at a fixed test pressure. An example of valve chatter is provided by rapid movement of a PCRS valve piston to and from its seat at a fixed test pressure in excess of the subject valve's preset preload pressure.

"Valving means" is intended to mean one or more of the instant PCRS valve units installed in the cylinder wall of a railcar cushion device unit according to the instant disclosure. Preferably, about 9 to about 11 valve units are mounted in the cylinder wall of a railcar cushion device unit to obtain a preload of either about 50,000 pounds (i.e., according to the tests specified in AAR M-921D-96) or about 100,000 pounds, (i.e., according to the tests specified in AAR M-921B-96.)

"Mounting means" is intended to mean an element capable of retaining the valving means in an aperture in a cylinder wall of a railcar cushion device. Representative mounting means include threads, locking rings, welds, cover/retaining plates with bolts threaded into the cylinder of the cushion unit, and the like.

"Hydraulic fluid pressure-bias means" is intended to refer to means by which hydraulic fluid pressure within a rail car cushion device cylinder is channeled through passages in the piston of the instant PCRS valve to effect a biasing and damping of motion of the subject valve piston against its seat (as disclosed further below).

"Spring-reset means" and spring return means are used interchangeably to mean a helical compression spring mounted within a PCRS valve according to the instant disclosure and capable of returning a piston to its seat in the subject PCRS valve when a flow rate of oil within the valve has dropped below a pre-determined preset value. The subject return means is unable to bias the piston against its seat until the flow rate of hydraulic oil has dropped to below the preset value. In a preferred embodiment, the pressure forces holding the piston in the open position at a predetermined cushion device cylinder pressure of 500 psi are less than about 15 pounds to about 40 pounds, preferably less than about 15 to about 30 pounds, and most preferably less than about 17 pounds.

"Preload value" is intended to mean a valve that remains closed until the pressure in the hydraulic cylinder rises into the range of predetermined pressure values at which the subject PCRS valve is preset to transition from the "closed" mode (i.e., supra, e.g., sealed against its seat) to the "open" mode (supra), i.e., either about 50,000 pounds according to AAR M-921D-96, or about 100,000 pounds, i.e., according to AAR M-921B-96.

"Draft", when used in regard to the location or position in a cushion device or a cushion device cylinder, is intended to mean the cushion device end closest to the rail car coupler when the subject cushion device is installed in an operational manner in a rail car.

"Buff", when used in regard to the location or position in a cushion device or a cushion device cylinder, is intended to mean the cushion device end furthest away from the rail car coupler, i.e., the end located toward the middle of a rail car, when the subject cushion device is installed in an operational manner in a rail car. The "¾-Buff" position, is intended to mean that position in the cushion device where 25% of the total cushion device stroke has been consumed. The "¼-Buff" position is intended to mean that position in the cushion device where 75% of the total cushion device stroke has been consumed.

"Apical end", when used in regard to the instant PCRS valve, apical is intended to mean that portion of the subject element that is located toward valve seat plate 12 i.e. away from housing base 18.

"Basal" when used in regard to the instant PCRS valve, is intended to mean that portion of the subject element that is located toward housing base 18 i.e. away from valve seat plate 12.

The hydraulic pressure within a cushion device being uniformly distributed on the interior convex surface of the cylinder wall and piston faces. The subject cylinder wall has an area for the convex surface ($A_c$) according to the following formula: namely, $$A_c=2\pi rh \qquad \text{[Formula I]}$$

Conversion of cylinder wall pressure from cushion unit "a" having a $\text{diameter}_a$ (e.g. 10-inch), $\text{stroke}_a$ (e.g. 10-inches) and a pressure "$P_a$" (e.g., 50,000 psi) to a cushion unit "b" having a $\text{diameter}_b$ (e.g., 8-inch), a $\text{stroke}_b$ (e.g., 10-inches) and a pressure "$P_b$" may be described by the following formula: namely, $$(\Delta r\Delta h)P_a=P_b \qquad \text{[Formula II]}$$

where $\Delta r=(\text{radius}_a/\text{radius}_b)$, and $\Delta h=(\text{cylinder height}_a/\text{cylinder height}_b)$. In the foregoing example, the conversion from 50,000 psi pressure in a 10-inch diameter cylinder ("a") to pressure in an 8-inch cylinder ("b") is $P_b=(50,000)(1.25)=62,500$ psi. Cushion units with other diameters of diameters of piston and cylinder may of course be accommodated according to the instant disclosure.

Pounds of applied coupler force are convertible into a corresponding pounds per square inch, psi, of pressure in a particular cushion device cylinder by dividing the pounds of force by the area, in square inches, of the cushion device piston face. For example, a cushion device having an 8-inch diameter piston has an area of about 50.2 square inches and a pressure of 3984 psi is developed when about 200,000 pounds of force is applied to the coupler.

In the following disclosure, PCRS valves and their use in the instant cushion device valving systems will first be described followed, at page 36, by SC valves and their use in the instant valving systems.

Experimentation at a special hydraulic test bench designed by the inventor, was used to identify critical elements in a pilot-controlled relief sequence (PCRS) preload valving system that might be capable of absorbing shock force pressure in a rail car cushion device under a range of different common operating collisions. The experimental methods evaluated rapid pressure rises, i.e., several thousand pounds per square inch (psi) occurring in just a few milliseconds. Pressure relief valves and metering valves were discarded in favor of a full-unrestricted-flow design. Prototypes were tested further for performance in a cushion device unit fitted to a railcar test device (disclosed by the inventor in U.S. Pat. No. 5,325,700; incorporated herein by reference). (The latter device was specifically invented to measure and record dynamic changes in pressure in cushion devices including response rates and performance during collisions on a test track.) Ultimately a PCRS valve design was achieved incorporating both a hydraulic pilot cylinder that uses cushion device fluid pressure, to bias the valve piston into its closed position until a predetermined preset cracking pressure was achieved, and a piston head fluid-flow-interrupter to bias the valve into its full-open position until a minimum flow rate through the valve was achieved (i.e., mirroring a pressure drop to within a predetermined acceptable range of pressure values.)

Critical elements of the PCRS valve were empirically determined to include at least the following: namely, (i) The means for variably biasing the valve piston into its closed-position against its seat—i.e., using a hydraulic pilot cylinder in the valve to respond to changes in cushion device fluid pressure and variably bias the piston head against its seat (Pressure-relief valves relying on a high tensile strength helical compression spring were found to be subject to metal fatigue, spring failure and resultant variable and unpredictable valve failure.);

(ii) The means for variably biasing the piston to retain its full-open position—i.e., by using forces generated by hydraulic fluid flow velocity into an "interrupter space" in the piston head to press the valve open until flow rates (and pressure) dropped to within a predetermined acceptable range;

(iii) The return means for closing the valve—i.e., using a weak spring to reset the valve;

(iv) The size relationships between the orifices, chambers, spaces, cylinder, piston and passages of the PCRS valve and including the positioning and size of the pathway for passage of hydraulic fluid through the PCRS valve (i.e., hydraulic fluid at high pressure, high flow rates was found to be capable of crushing and distorting valve elements; and vortexing and non-linear fluid flow at high pressures were highly significant factors leading to valve chatter, hammering, turbulence and valve failure);

(v) The number (and position) of individual PCRS valves within the cylinder wall of a cushion device; and, (vi) The shape, size and design of individual PCRS valve components including e.g. the housing, piston head, spring sleeve, and other elements as disclosed further below.

Each PCRS valve element was tested, altered and optimized empirically at a test bench and in railcars involved in train action test collisions on test tracks until a valving system was created that was capable, on the one hand, of retaining fluid during low velocity, low load collisions and during slack action drafting motions; while, on the other hand, rapidly and cleanly releasing pressures resulting from high velocity and/or high load collisions. In the analysis the size and shape of the entry and exit passages and internal chambers was altered and hydraulic "opening" pressure forces (i.e., the collision force hydraulic pressure) balanced against the "closing" forces, i.e., the hydraulic bias force applied by the hydraulic pilot cylinder (below). The instant PCRS valve cracks cleanly to give clean hydraulic fluid flow under a variety of different applied coupler forces e.g., from about 50 thousand pounds to pressures in excess of a million pounds. The subject PCRS valving system installed in a retrofitted (e.g., "improved") cushion device having an 8-inch diameter piston and 10-inch stroke, passed all tests required under AAR M-921B-96 (Appendix A) and M-921 D-96 (Appendix B), and is believed by the inventor to be the only improved cushion device (to date) to have passed all the tests and achieved full AAR certification (i.e., without exemption) under these specifications.

During the testing, certain anomalous behavior was detected in the PCRS valves during high speed impacts. Recordings of pressure from the test instruments capable of detecting 600 parts per second, suggested at the earliest post-impact times that the tail of a million pound pressure spike was being recorded with the potential for much higher peak values. The nature of the discovery suggested to the inventor that a novel solution was required to remove the spike and thereby prolong the life of the PCRS valve, and improved cushion devices having these valving systems. A one-way spike control (SC) valve was developed which is capable of reacting within a microsecond (or less), and within the first ⅛-inch of piston movement, to unload a predetermined preset amount of oil, i.e., about 1 to about 10 ounces dependent upon the total volume of hydraulic oil within a cushion device cylinder. In railcar tests, unloading the oil during the spike eliminated the apparent early time pressure spike while still allowing the PCRS valves to function normally and without interference or altered performance. Following release of the oil, the spike control valve rapidly snapped shut and remained closed as the piston was compressed toward the full buff position. In a representative improved cushion device having an 8-inch diameter piston and a 10-inch stroke, with 12 PCRS valves installed in the cushion device cylinder wall and 1 SC valves installed in the piston face of the cushion device, the predetermined preset amount of hydraulic oil unloaded to remove the spike was determined to be about 2 to about 8 ounces, i.e., dependent upon speed of the impact. The subject SC valve design incorporates features which maintain it in a closed position as the cushion device piston returns from its compressed buff position to the fully extended draft position. The subject SC valve will also not open to unload oil unless a preset preload pressure of either 50,000 pounds (i.e., according to AAR M-921D-96) or 100,000 pounds (i.e., according to AAR M-921B-96) is exceeded.

Having establishing critical elements and engineering solutions provided according to the instant disclosure, skilled artisans will of course recognize that, (according to the accompanying disclosure), alterations may be made within the spirit and scope of the invention.

Accordingly, it is an object of the invention to provide a PCRS valving systems for railcar cushion devices. The instant PCRS valves are not pressure relief valves or metering valve, but instead are capable of responding to preset pressure to release hydraulic fluid in order to control train action and slack action drafting impact forces encountered within a range of operating conditions in railcars.

It is a further object, to provide PCRS valving systems comprising a number of individual PCRS valves located at different predetermined positions within the cylinder wall of a cushion device and capable of releasing hydraulic fluid to achieve controlled performance according to the test performance specifications set forth in AAR M-921B-96 or M-921D-96 and within a range of pre-selected pressure values during railcar collisions at different speeds selected from within the range of 0.1 to 14 miles per hour (MPH). It is still a further object to provide a PCRS valving system mountable within the cylinder wall of a cushion device and capable of releasing hydraulic fluid to achieve controlled performance during collisions where the cushion device piston resides at time of impact in a fully extended position, or in a ¾-buff position, or in a ¼-buff position. In another object, the invention provides a PCRS valve that operates at applied coupler forces in excess of one million pounds with free, unrestricted flow of hydraulic oil and without turbulence, piston valve hammering, chattering or failure. In yet other objects, the invention provides valving systems capable of absorbing a variety of different impact forces and resultant hydraulic pressures, over speed ranges varying from less than 1 MPH to about 10 MPH (AAR M-921D-96) and about 14 MPH (AAR M-921B-96) between railcar rolling stock having gross rail weights from about 150,000 pounds to about 263,000 pounds. It is still a further object to provide a PCRS valving system mountable within the cylinder wall of a cushion device and capable of releasing hydraulic fluid to achieve controlled performance during collisions conducted according to AAR Specification M-921B-96 or AAR Specification M-921D-96, both documents incorporated herein by reference and set forth in part in Appendices A and B, respectively.

It is yet a further object, to provide an improved cushion device having a valving system made up of both PCRS and SC valves. According to alternative embodiments of the invention, improved cushion devices are provided having only PCRS valves, or both PCRS and SC valves. In either of the subject embodiments, varying the numbers and positions of the PCRS valves mounted in the cylinder walls in a manner effective to provide a flexible valving system capable of accommodating a wide range of different impact forces encountered in railcar operations while at the same time minimizing ‘slack-action’ and train action forces between railcars drafting one another during transit. Preferably, the performance specification for the subject improved cushion devices are capable of at least conforming to the range of qualification test results set forth by the AAR in M-921B-96 and M-921D-96.

In another object, the invention provides a PCRS valve that operates at applied coupler forces of up to several million pounds to allow free, unrestricted flow of hydraulic fluid without turbulence, piston valve hammering or chattering such as may lead to valve failure.

In another object the invention provides a preload valving system installed in a rail car cushion device that confers upon the cushion device the capability to provide shock absorption capability of: dissipating impact forces during collisions at up to 14 miles per hour (MPH); improving ‘slack action’ during transit; minimizing bounce-back after collisions at speeds of up to 3 MPH; and, maintaining forces within the cushion device in the prescribed ranges specified in AAR M-921B-96 and M-921D-96. The instant PCRS valving system was tested and was certified according to AAR M-921B-96 and M-921D-96, incorporated herein by reference and reproduced (in part) in Appendices A and B, below.

Embodiments of the invention provide a PCRS valve actuated toward a closed position by the pressure of hydraulic fluid in the cushion device until a predetermined preset pressure is reached at a corresponding applied coupler force value, at which time a piston is actuated to open the valve and allow a free, unrestricted flow of hydraulic fluid from the cushion device cylinder. In a first representative example (which is also one preferred embodiment), a cushion device according the M-921D-96 having a 50,000 pound preload, the subject PCRS valve has a collision duty cycle in which it is closed at about 50,000 to about 55,000 pounds of coupler force; cracks open to full flow at about 56,000 to about 69,000 pounds; and remains open until the force drops to about 25,000 to 50,000 pounds. Most preferably, the subject PCRS valve has a collision duty cycle in which it is closed at about 60,240 pounds of coupler force; cracks open to full flow at about 62,750 pounds; and remains open until the force drops to about 25,000 pounds. In other representative examples (and alternative preferred embodiments), the PCRS valve duty cycle may be set to crack open at greater than either 75,000 pounds of coupler force (AAR specification) or at greater than 100,000 pounds of coupler force (AAR M-921B-96).

In another embodiment, the invention provides a spike control (SC) valve bias toward a closed position at 50,000 pounds (AAR M-921D-96) of coupler force, or, in alternative embodiments at either 75,000 pounds (AAR specification) or at 100,000 pounds of coupler force (AAR M-921B-96), in such manner that the subject SC valve transitions from a closed position to an open position within less than about 1 microsecond to about 1.7 microseconds, and as the cushion device piston travels about ⅛-inch from a full draft (neutral) position toward a buff position; and, in such manner that a predetermined preset volume of hydraulic oil is released from the cushion device cylinder and that spike pressure rises in the subject cylinder are eliminated.

In yet another embodiment, a PCRS valve is provided having a pilot-operated hydraulic biasing cylinder means to set a predetermined hydraulic pressure value at which a piston is actuated to open the valve. The subject biasing means forces the valve piston against its seat until counterbalanced by the predetermined preload value of hydraulic fluid in the cushion device. Preferably, in one alternative embodiment the collision duty cycle of the subject PCRS valve installed in a cushion device having an 8-inch diameter piston and set for a 50,000 pound preload resistance is as follows: namely, the PCRS valve piston is biased toward the closed position at hydraulic pressures of up to about 1125 psi; the piston cracks open at about 1125 to about 1300 psi, most preferrably about 1250 psi; and, the piston remains biased toward the open position until the pressure in the cushion device cylinder drops to about 500 psi to about 1000 psi.

Embodiments of the invention provide a variety of different PCRS valving systems set to release hydraulic fluid at predetermined values in cushion devices having different piston (and cylinder) diameters (and bore volumes). The subject preset pressure values determine the amount of resistive force applied to a cushion device piston as it traverses a cylinder. The subject systems may, optionally, include SC valves when it is considered necessary to remove spike pressures to improve performance or working life of the valves or cushion device unit. In a first representative example a PCRS valving system comprises about 11 to about 12 individual PCRS valves fitted in the cylinder wall of a 70 ton capacity railcar cushion device having a piston with a diameter of about 8 inches and a stroke of about 10 inches. In a second representative example, a PCRS valving system comprises about 8 to about 12 individual PCRS valves fitted in the cylinder wall of a railcar cushion device (e.g., 10-GME-D) having a piston with a diameter of about 10 inches and stroke of about 10 inches. In a third representative example, a PCRS valving system comprises individual PCRS valves fitted in the cylinder wall of a 100 ton capacity railcar cushion device (e.g., 15-GME-D) having a piston diameter of about 10 inches and a stroke of about 15 inches.

Figure 12:
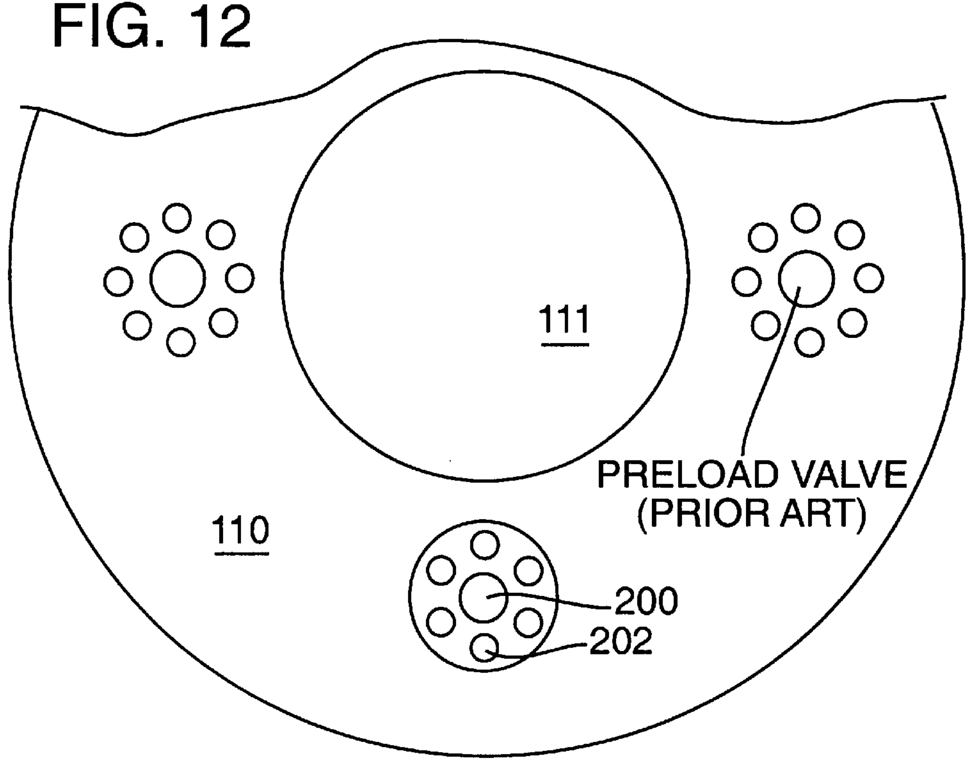
FIG. 12 depicts a rear view of a cushion device piston head having exit passages for an SC valve, and passages from a preload valve known in the art.
Figure 13:
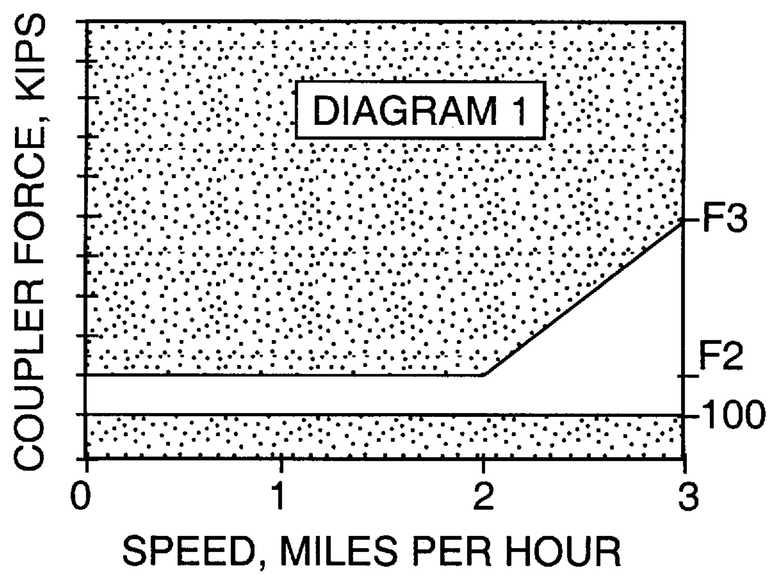
FIG. 13 depicts graphically AAR performance specifications in accord with certification under M-921B-96 and as disclosed further in Appendix A, below.
Figure 14:
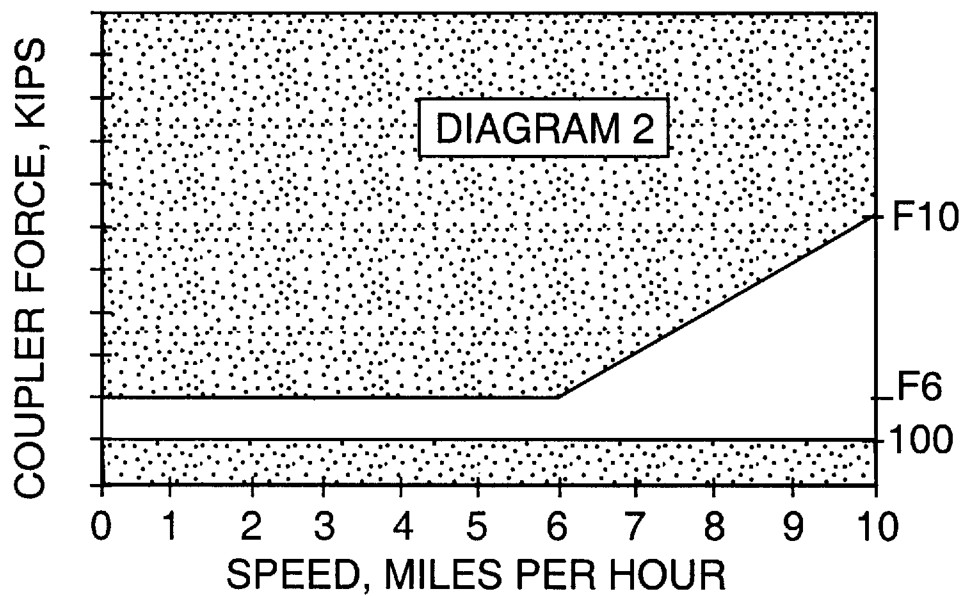
FIG. 14 depicts graphically AAR performance specifications in accord with certification under M-921B-96 and as disclosed further in Appendix A, below.
Figure 15:
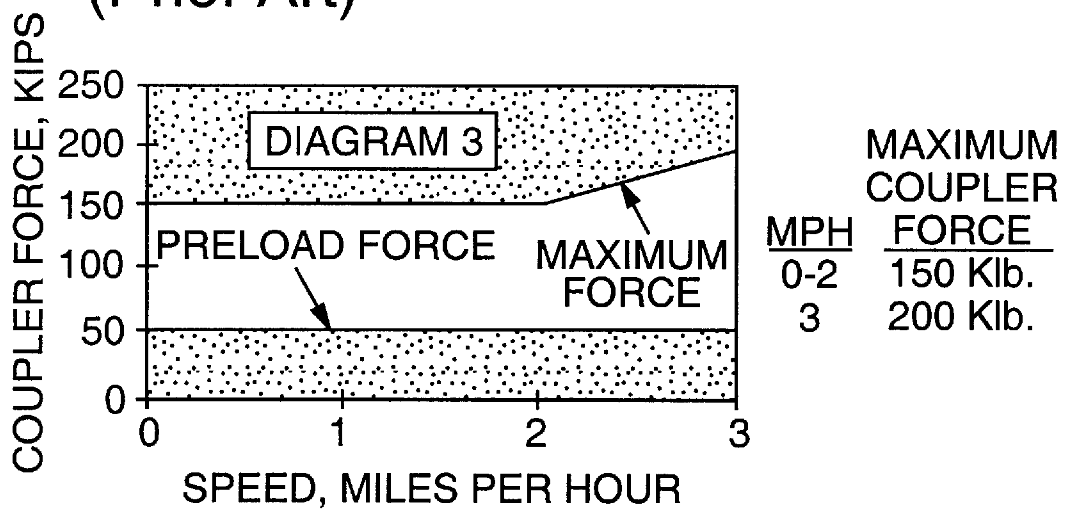
FIG. 15 depicts graphically AAR performance specifications in accord with certification under M-921D-96 and as disclosed further in Appendix B, below.

The inventor has previously disclosed position, velocity, force graphic profiles with time, for normal and damaged railcar cushion devices at FIGS. 12 and 13 (and accompanying disclosures) in U.S. Pat. No. 5,325,700 (incorporated herein by reference). The subject force graphic profiles mirror the resistive force within a cushion device as a function of the position of a cushion device piston, or its velocity of movement. The subject disclosure relates to force graphic profiles constituting a generally bell-shaped (although somewhat ragged) curve (i.e., rising somewhat linearly with time to a peak force and then falling). According to embodiments of the invention, the instant valving systems are useful in constructing improved cushion devices that function to generate a variety of different force graphic profiles.

Embodiments of the invention provide preload valving systems made up of a number of individual different PCRS valves mounted in apertures along the cylinder wall of a cushion device cylinder (as disclosed further below). The subject PCRS valves, so mounted to form the instant preload valving system, may all "open" (as defined below) at the same preload pressure, or may "open" at different preload pressures. In one presently preferred embodiment, the PCRS valves so mounted release hydraulic fluid at progressively greater pressures so that resistive force encountered by the cushion device piston is increasing in a stepwise manner as the piston traverses the cushion device from the draft end to the butt end.

The subject valving systems are usefully installed in new (manufactured original equipment, OEM) and used (i.e., re-manufactured or repaired) cushion devices.

In one representative example the instant valving system is installed during rebuilding an existing used cushion device having a piston/cylinder diameter of about 8- to about 10-inches, and about 12 of the instant PCRS valves are mounted in special cavities machined into existing apertures in the subject cushion device. In this particular example, all of the subject valves are conveniently preset to a predetermined as follows coupler force values: namely, to open at about 50,000 pounds (i.e., according to M-921D-96, Appendix B, below), or at about 70,000 pounds, or at about 100,000 pounds (i.e., according to M-921B-96, Appendix A, below.) In a second representative example of the instant valving system, installation is in OEM cushion devices and about 9 to about 15 of the instant valves are mounted in apertures in the wall of cushion device cylinder, e.g., at positions along a helical axis subscribed about the subject cylinder. The mounting positions of the instant preload pilot valves and preload pressures in an OEM (or remanufactured) cushion device are preferably varied to achieve the result according to a current, or future, AAR specifications, e.g., M-921B-96 and M-921D-96. Skilled artisans will of course recognize that the number and preload pressures of the instant valves comprising the instant valving system may be varied to accomplish different shock damping (i.e., instant PCRS valves closed) and shock absorbing (i.e., instant PCRS valves open) response rates (e.g., according to the incorporated disclosure, supra) and graphic response profiles having different peak pressures.

Embodiments of the invention provide a relatively small PCRS valves for mounting in an annular spaces in the wall of a central cylinder in a cushion device unit and in fluid communication on one side with the cylinder and on the other side with a space between the central cylinder and outer casing of a rail car cushion unit. The instant valve unit is preferably less than about 1½ inches in diameter to about ¾ inch in diameter, and most preferably about 1 inch in diameter.

Embodiments of the invention provide a PCRS valve having a valve seat, a piston with a piston head, and a pilot hydraulic cylinder using pressure in the cushion device cylinder to bias the PCRS valve piston head against its seat. In other embodiments, the invention provides hydraulic biasing means for the instant PCRS valve including a pilot channel communicating through a valve piston shaft from the cylinder chamber in the cushion unit at the one end to a valve dashpot sealed with by an O-ring at the other end. Fluid forced into the pilot channel is expressed into the dashpot to force the valve piston against its seat (as disclosed further below). In alternative embodiments, the invention provide PCRS valves opening at different preset pressure values. Hydraulic pilot pressure in the instant PCRS valve is determined by the difference in cross-sectional area between the valve entry passage, e.g., valve seat plate passage 24 (as disclosed further below), and the cross-sectional area of the pilot entry to the hydraulic biasing cylinder, e.g., piston passage 33, below. In the subject representative example, below, piston passage 33 has a cross-sectional area of about 0.003 square inches which is about 3% of the cross-sectional area of valve seat plate passage 24, i.e., 0.100 square inches. Preferably, the cross-sectional area of the pilot passage is about 1% to about 10% of the cross-sectional area of the biasing chamber, and most preferably about 3% to about 5%. In the representative example below, at a pressure of about 1250 psi in a cushion device cylinder the subject pressure in the pilot hydraulic chamber provides about 12 pounds to about 14 pounds of force biasing the subject piston head against its seat. (In an 8-inch diameter cushion device, having a piston head surface area of about 50.2 square inches, a pressure of 1250 psi in the cushion device cylinder corresponds to an applied coupler force of about 62,750 pounds of compressive force, i.e., 50.2 square inches multiplied times 1250 pounds per square inch.) By changing the number or position of PCRS valves, or varying the hydraulic pilot pressures, embodiments of the invention provide flexible cushion device valving systems capable of opening at different predetermined preset pressure values, and corresponding coupler compression forces. Installation of the subject valving systems into a new, or rebuilt, cushion device similarly provides improved cushion device capable of test performance according to a variety of current and future AAR specifications, e.g., AAR M-921B-96 and M-921D-96. The subject improved cushion devices with the instant valving systems, thus functions to absorb a variety of different impact forces in a series of controlled "surges" of resistive force applied by the hydraulic pressure in the cushion device.

In yet other embodiments, the invention provides PCRS valves that, once open, are forced to remain in the open position by flow of hydraulic oil into an interrupter space in the piston head until the pressure in the cushion device cylinder drops to a predetermined preset value. In the representative example below, at a pressure of about 500 psi the flow of oil is sufficiently low that it exerts about 15–40 pounds of force on the surfaces of the subject interrupter space, preferably about 15 to about 30 pounds, and most preferably less than 17 pounds. The flow rate of hydraulic oil into the subject interrupter space is subject to the following relationships: namely, taking the cross-sectional area of the passage into the valve, (e.g., valve seat plate passage 24, below) as 1.0, then the cross-sectional area of the instant interrupter space (e.g., interrupter space 46, below) is about 8 to about 11, preferably 10; the cross-sectional area by which hydraulic oil may exit from the piston head chamber (e.g., piston head cavity 21) is about 1.7 to about 3, preferably 2.1.

Embodiments of the invention provide PCRS valves having a size and shape of entry and exit passages in the instant valves; and, a size and shape of internal chambers and passages within the valves capable of effecting both a predetermined preset hydraulic pressure, and a pressure actuated release of fluid through the instant valve that is rapid, clean (i.e., without turbulence) and without valve piston chatter (as defined below).

FIG. 1 schematically depicts in cutaway plan view a railcar cushion device 100.

Figure 2:
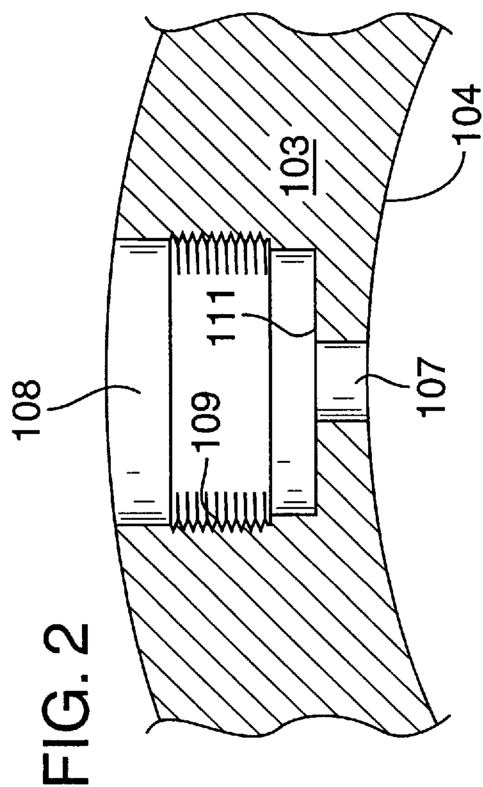
FIG. 2 depicts a cross-sectional side view of a portion of cylinder wall of the cushion device of FIG. 1 machined to receive a PCRS valve.

FIG. 2 depicts a cross-sectional side view of a portion of cylinder wall 103 of the cushion device of FIG. 1.

Railcar cushion device 100 has coupling 101 (i.e., to a railcar coupler) and an external casing 102 enclosing a cylinder wall 103 with a cylinder bore 104 in which a cushion device piston 105 is slideably retained by seals. A circumferential annular space 106 surrounds the exterior of cylinder wall 103 and is bounded by the interior of casing 102. Cylinder wall 103 contains several apertures 107 (FIG. 2) allowing fluid communication between cylinder bore 104 and aperture cavities 108; each aperture cavity 108 having a cavity step 111. (Further details of cushion device units are disclosed by the inventor in U.S. Pat. No. 5,325,700, e.g. at FIG. 1 and accompanying disclosure, incorporated herein by reference.)

Figure 3A:
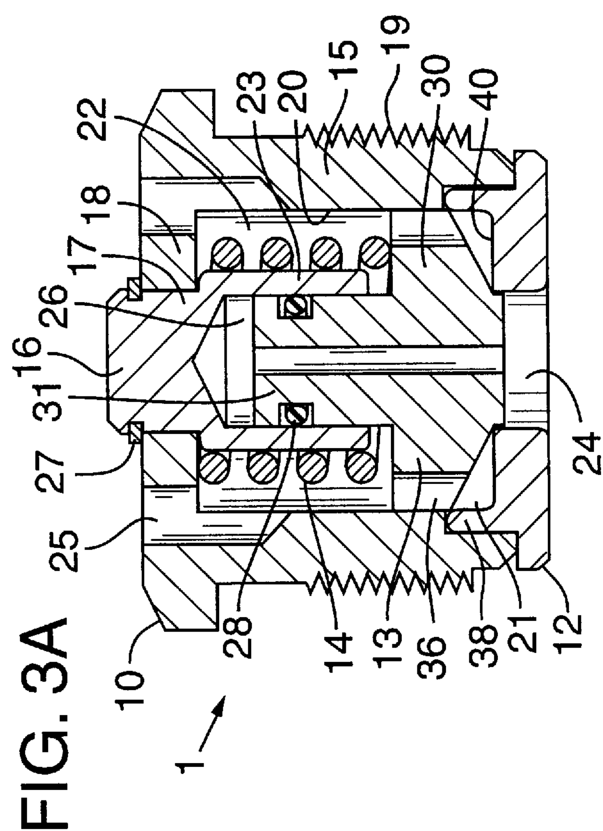
FIG. 3A depicts a side cutaway view of a first PCRS valve according to one preferred embodiment of the invention, as described further below.

Aperture cavity 108 (FIG. 2) is capable of receiving and retaining a PCRS valve 1 valve housing 10 and may have a mounting means for retaining the valve housing 10 within aperture cavity 108, e.g., threaded wall 109 for receiving e.g. valve housing 10 threads 19 (FIG. 3A, below).

FIG. 3A depicts a side cutaway view of a first PCRS valve according to a preferred embodiment of the invention.

Figure 3B:
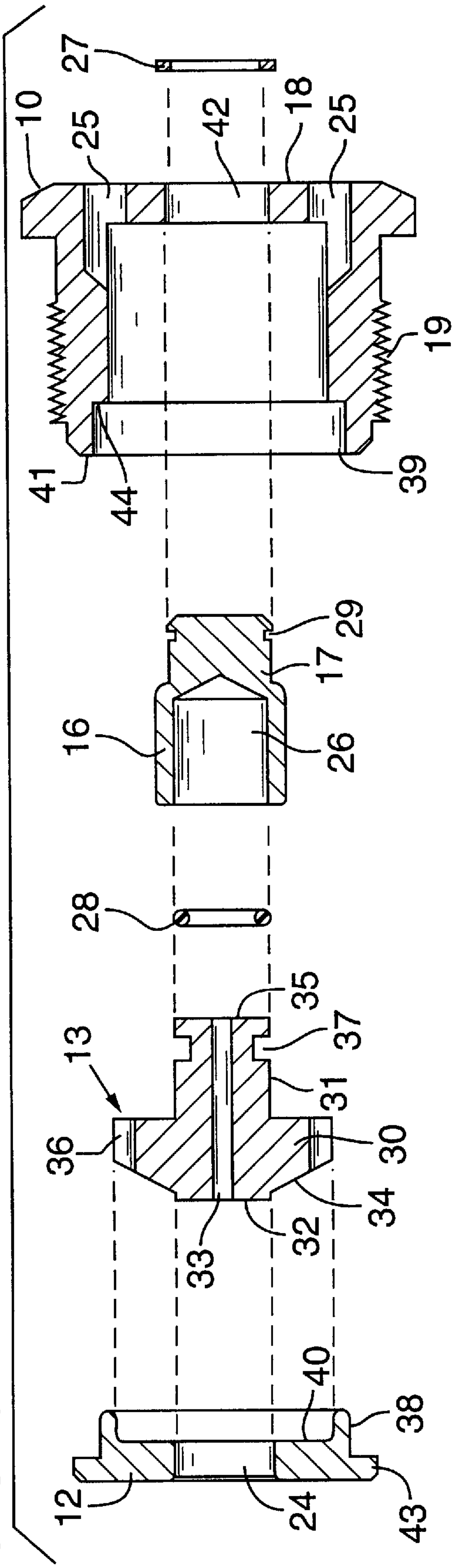
FIG. 3B depicts an exploded view of the first PCRS valve of FIG. 3A.

FIG. 3B depicts an exploded view of the first PCRS valve of FIG. 3A.

Figure 3C:
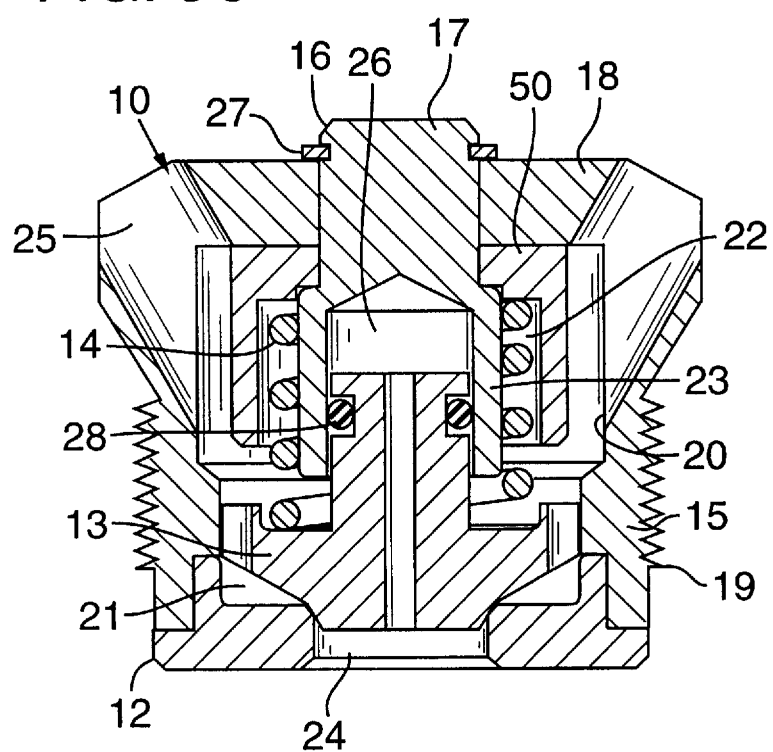
FIG. 3C depicts a side cutaway view of a second PCRS valve according to an embodiments of the invention.

FIG. 3C depicts a side cutaway view of a second PCRS valve according to a most preferred embodiment of the invention.

Figures 3D, 3E:
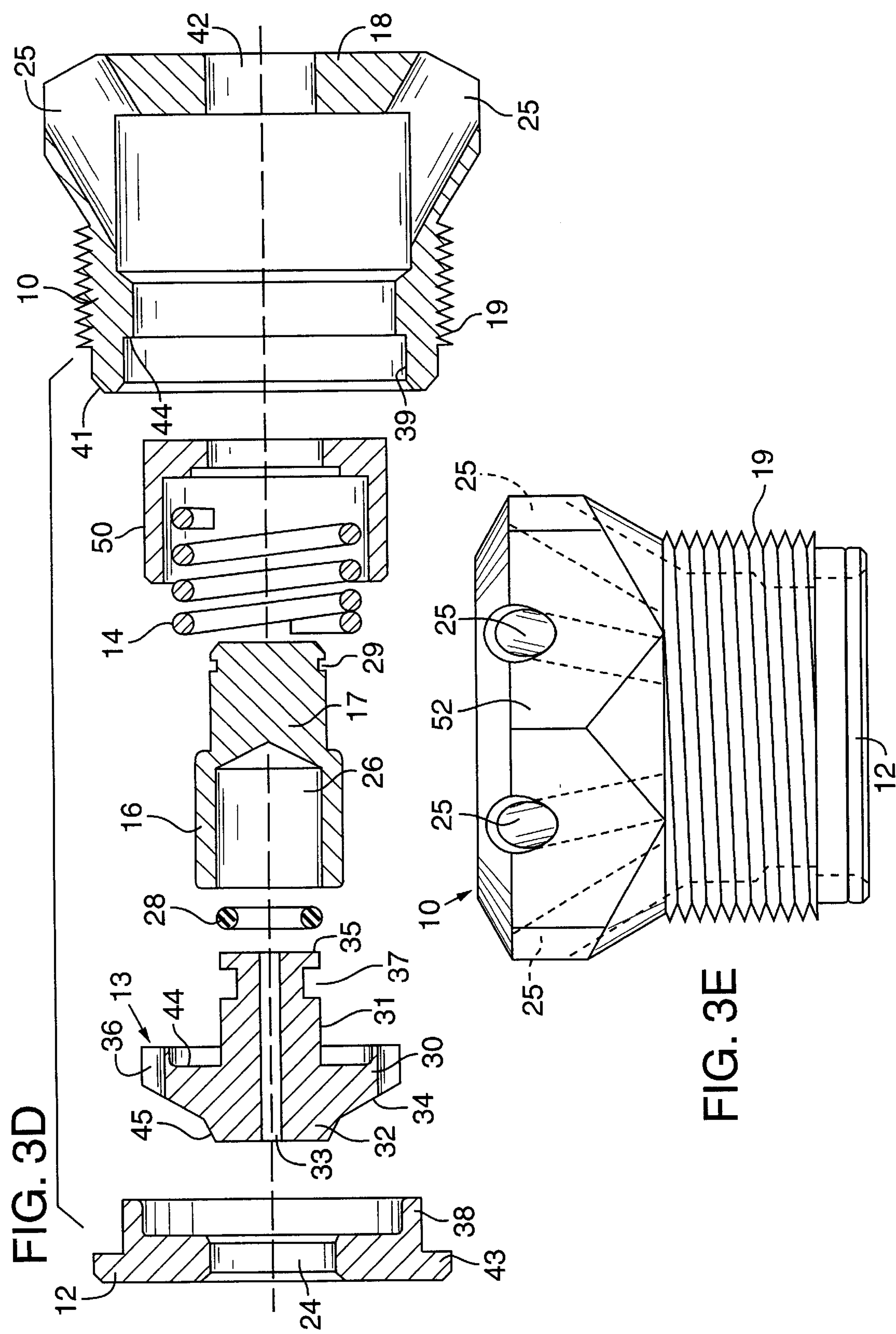
FIG. 3D depicts an exploded view of the PCRS valve of FIG. 3C.
FIG. 3E depicts a plan side view of the PCRS valve of FIG. 3C and FIG. 3D.

FIG. 3D depicts an exploded view of the PCRS valve of FIG. 3C.

FIG. 3E depicts a plan view of the PCRS valve of FIGS. 3C–D.

According to a first and preferred embodiment, PCRS valve 1 (FIGS. 3A–3B) includes a cylindrical valve housing 10 having housing wall 15 enclosing valve piston 13 and reset spring 14. At one end, housing 10 has a recess portion 39 for receiving removable valve seat plate 12. At its other end, housing 10 has a housing base 18. The interior housing wall 20 (i.e., of housing wall 15) is preferably smooth (e.g., about a #16 finish and a hardness of about 24 Rockwell to about 28 Rockwell, abbreviated herein Rc) for receiving valve piston 13 and reset spring 14. Valve housing 10 also includes opening 42 in base 18 for receiving piston spring sleeve 16 (depicted in exploded view in FIG. 3B).

According to a second and presently most preferred embodiment, PCRS valve 1 (FIGS. 3C–3E) includes the components of the PCRS valve according to FIGS. 3A–3B, supra, and (i) spring support sleeve 50 (FIGS. 3C–3D); and, (ii) housing exit passages 25 at the apical (rather than basal) end of spring orifice cavity 22. Exit passages 25 traverse housing 10 diagonally from the apical end of spring support sleeve 50 to find openings in hex head facets 52 (FIGS. 3C, 3E and 4B) in housing base 18.

The periphery of the exterior of housing wall 15 has a mounting means for retaining valve housing 10 in cavity 108 of cushion device cylinder wall 103, e.g., threads 19 (FIGS. 3A–3B; 3C–3E) capable of engaging threads 109 in cushion device cylinder wall 103 (FIG. 2). When installed in cushion device 100 cylinder wall 103 valve seat plate 12 (FIGS. 3A–3E) is engaged against cavity step 111 (FIG. 2). Preferably, when fastened within cavity 108 the face of valve seat plate 12 is sealed to within less than about 0.008-inches of cavity step 111.

Cushion devices 1 having differing diameters of pistons 105 and cylinder bores 104 may of course be accommodated according to the instant invention.

Figure 4A:
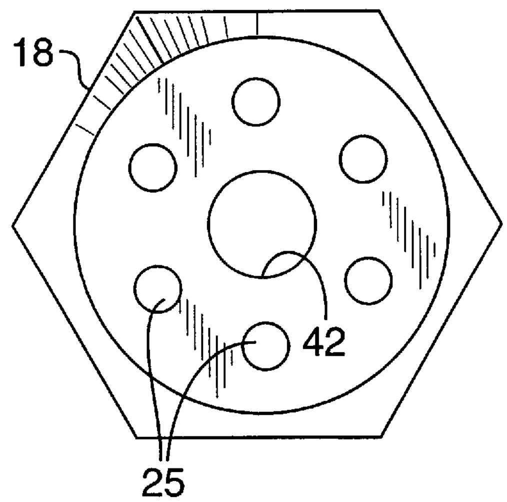
FIG. 4A depicts an exterior view of the housing base for the PCRS valve depicted in FIGS. 3A and 3B.

FIG. 3B depicts an exploded view of a first PCRS valve 1 showing the positional relationships (from left to right) between the following subcomponent elements: namely, valve seat plate 12; valve piston 13; valve piston rod seal 28; piston spring sleeve 16; and housing 10. Describing next the individual features of each component, valve seat plate 12 has passage 24, and when PCRS valve 1 is install in cushion device 100 cavity 108 passage 24 is in fluid communication through aperture 107 with cylinder bore 104. When installed in cavity 108, the face of valve seat plate 12 (i.e., to the left in FIG. 3B) is in sealed contact along the exterior-side of a radial shoulder portion 43 of PCRS valve seat plate 12 with cavity step 111 (FIG. 2). On its opposite (interior-side), shoulder portion 43 is in sealed contact with a lip portion 41 in valve housing 10 (FIGS. 3B and 3D), and lateral movement of the valve seat 12 in relation to housing 10 is restricted by valve seat tongue portion 38 which engages the lateral walls 39 of a recess in the interior of housing 10. Features of the base of PCRS valve housing 10 of FIGS. 3A–3B are depicted in FIG. 4A showing the positions of opening 42 for receiving piston spring sleeve 16 in relation to six radial hexagonally aligned exit passages 25.

Figure 4B:
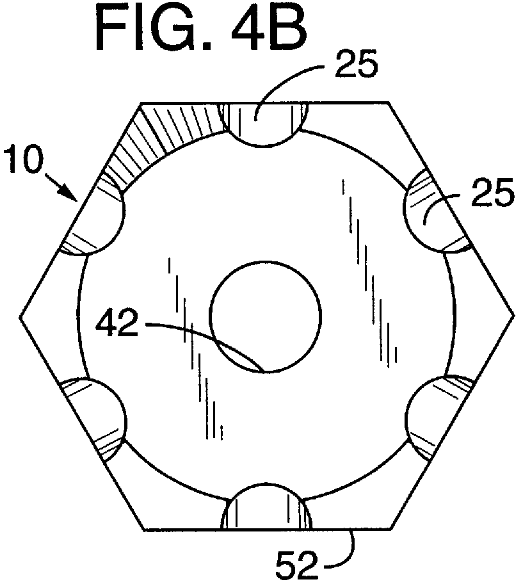
FIG. 4B depicts an exterior view of the housing base for the PCRS valve depicted in FIGS. 3C–3E.

FIG. 3C depicts an exploded view of a second, and presently most preferred, PCRS valve 1 showing the positional relationships (from left to right) between the identical subcomponents of FIGS. 3A–3B, but with the additional most preferred differences. Namely, the PCRS valve depicted in FIGS. 3C–3E contains spring support sleeve 50 to stabilize reset spring 14 preventing collapse and allowing the possible use of a more resilient spring 14 having a faster response time and smaller structural modulus. When assembled, spring support sleeve 50 is trapped into position between the base of piston spring sleeve 16 and the interior floor of housing base 18. The interior wall of sleeve 50 and the exterior wall of piston spring sleeve 16 subscribe spring orifice cavity 22. Features of the base of PCRS valve housing 10 of FIGS. 3C–3E are depicted in FIG. 4B showing the positions of opening 42, for receiving piston spring sleeve 16, in relation to six radial hexagonally aligned exit passages 25 in facet faces 52 (FIG. 3E).

Referring to FIGS. 3A–3E and FIGS. 5A–5B, piston 13 has the following elements: namely, piston head 30 and piston rod 31. Piston head 30 preferably has a cap portion 32, that in closed mode (supra) engages against the interior-face of valve seat 12; a piston passage 33, that operates in the hydraulic biasing means for piston 32 (i.e., according to the accompanying disclosure); and, a piston head tapered plane portion 34, i.e., acting in open mode to direct hydraulic fluid to the periphery of head 30 (as disclosed further below). Piston rod 31 preferably has a piston rod base 35 and a recess 37 for receiving seal 28. Seal 28 is preferably an O-ring-type seal and serves the function of slideably retaining and sealing piston rod 31 within piston spring sleeve 16. When PCRS valve 1 is assembled, the basal surface of piston cap 30 engages one end of reset spring 14 (FIGS. 3A, 3C–3D; not depicted in FIG. 3B) and the lateral interior surfaces of reset spring 14 are movably retained between the exterior surface of piston spring sleeve 16 and interior housing wall 20 (FIG. 3A). or within spring support sleeve

50 (FIG. 3C). In the preferred embodiment depicted in FIGS. 3C–3D, the basal portion of piston cap 30 preferably has spring seat recess 44 for receiving one end of reset spring 14.

Piston travel is limited by reset spring 14, preferably to a piston travel of about 0.180-inches. The amount of piston travel serves to define the maximal volume (TABLE 3, below) of piston head cavity 21 (supra; FIGS. 3A, 3C). The diameter and height of piston passage 33 serves to define a volume (TABLE 3) that is determinative of the hydraulic biasing means (supra), i.e., the hydraulic pressure force applied against piston rod base portion 35. In one alternative embodiment for installation in a cushion device having a piston diameter of about 8 inches to about 11, inches, piston passage 33 has a diameter of about 1/16-inch (i.e., 0.062-inches), and reset spring 14 is a helical compression spring having about four 0.082-inch diameter (i.e., structural modulus) coils and exerting a maximum biasing force of about 12 to about 28 pounds, preferably about 12 to about 14 pounds, within a maximum deflection of about 0.116 to about 0.180-inches (TABLE 2, below).

Piston spring sleeve 16 (FIGS. 3B, 3D) has an inner piston biasing dashpot 26 that (when assembled) is in fluid communication through piston passage 33, valve seat plate passage 24, and cushion device cylinder wall aperture 107 with cylinder bore 104. The lateral walls of dashpot 26 slideably engage seal 28 thereby slideably retaining piston 13 within piston spring sleeve 16. In optional embodiments, piston spring sleeve 16 may be integral with the base portion 18 of housing 10 (e.g., milled or cast into the housing base), but in the particular embodiment depicted in FIG. 3B and FIG. 3D chamber 16 slideably engages into opening 42 in housing base 18 and is fixedly retained in place by engaging optional retainer 27 (e.g. a circlip-type retainer) into retainer recess 29. (In the absence of retainer 27, screwing the valve housing tightly into the cushion device cavity is effective to retain all of the constituent PCRS valve elements within housing 10.) In addition to opening 42, housing base 18 contains exit passages 25 (FIGS. 4A, 4B) that allow free escape of hydraulic fluid from within valve housing 10 into cushion device circumferential annular space 106 (FIG. 1).

FIG. 4A depicts an exterior plan view of the housing base 18 of the PCRS valve of FIGS. 3A and 3B, showing the central orientation of opening 42 and the radial relationship of exit passages 25. FIG. 4B depicts an exterior plan view of the housing base 18 of the PCRS valve of FIGS. 3C–3E. The particular embodiment illustrated in FIGS. 4A and 4B depict six hexagonally arranged exit passages 25, but in other alternative embodiments other orientations and numbers of exit passages 25 are envisaged according to the general benchmarks disclosed in regard to TABLE 3, below.

Figure 5A:
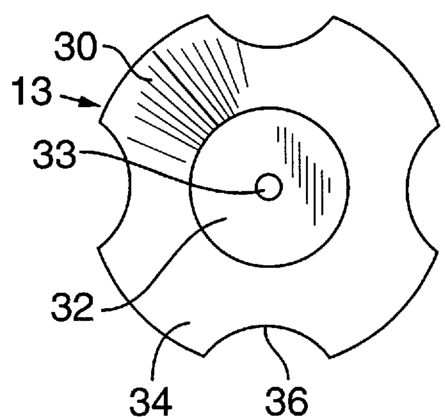
FIG. 5A depicts a plan view of the head portion of the valve piston operative in the PCRS valve of FIGS. 3A and 3B.
Figure 5B:
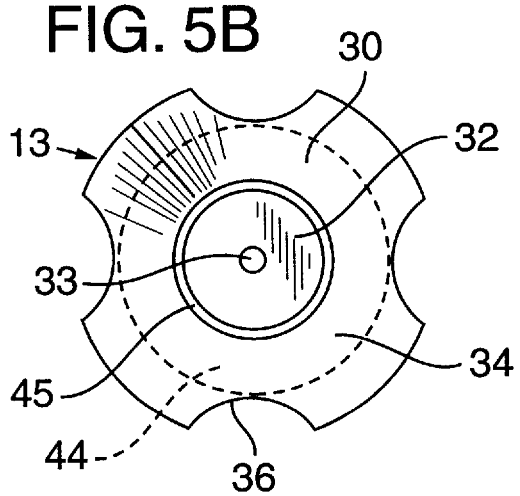
FIG. 5B depicts a plan view of the head portion of the valve piston operative in the PCRS valve of FIGS. 3C–3E.
Figure 5C:
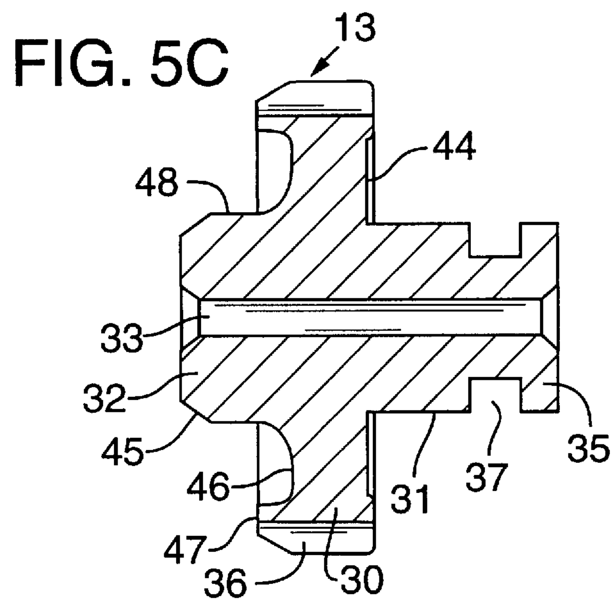
FIG. 5C depicts a side cross-sectional view of alternative valve piston operative in the PCRS valve of FIGS. 3C–3E.
Figure 5D:
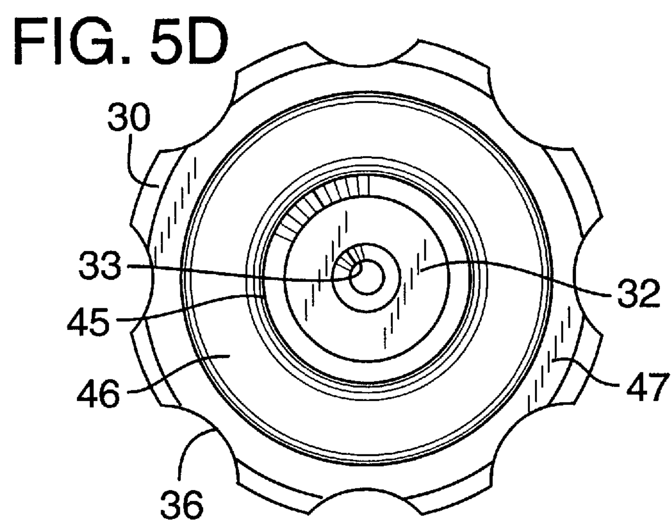
FIG. 5D depicts a plan view of the head portion alternative valve piston of FIG. 5C.

Further details of piston head 30 are depicted in FIGS. 5A–5D. An illustrative plan view of the valve piston 13 of FIG. 3A is depicted in FIG. 5A, and piston 13 of FIGS. 3C–3E is depicted in FIG. 5B. An alternative, and presently most preferred, piston operative in the valve of FIGS. 3C–3E is depicted in FIG. 5C and FIG. 5D. The most preferred piston 13 is depicted in side cross-sectional view in FIG. 5C, and the head portion of which is depicted in plan view in FIG. 5D.

Piston 13 is preferably of about 18 Rc to about 52 Rc in hardness, and most preferably about 38 to about 42. Valve seat plate 12 is preferably of about 18 Rc to about 52 Rc and most preferably about 42 Rc to about 46 Rc. Housing 10 is preferably mild steel of about 16 Rc to about 18 Rc that is heated to achieve about 26 Rc to about 30 Rc. Spring sleeve 16 is preferably from a heat treated rod steel having a final hardness of preferably about 18 Rc to about 52 Rc and most preferably about 28 Rc to about 32 Rc. (Harder components may be brittle and subject to failure, e.g., a piston having a hardness of about 70 Rc failed.)

In preferred embodiments, piston head 13 has flat cap portion 32 having passage 33 communicating with dashpot 26. Cap portion 32 is capable of engaging valve seat plate 12 to seal passage 24 (FIGS. 3A–3D); and transitions at about 90-degrees (i.e., to the horizontal axis of piston 13) to a circular tapered plane portion 34. The presently preferred piston 13 depicted in FIGS. 3D and 5B also has cap portion 32, but transitions to the tapered plane portion 34 at an angle of about 61-degrees (rather than 90-degrees).

The presently most preferred piston 13 (FIGS. 5C–5D) has a cap portion 32 with a tapered edge portion 45 that makes an angle of about 28-degrees to about 29-degrees relative to the to the horizontal axis of piston 13. The latter cap edge 45 transitions into a cap wall portion 48 that is parallel to the long axis of piston 13. At its base, cap wall portion 48 is curved forming the interior curvature of interrupter space 46 (FIG. 5C). The function of the latter interior curvature of interrupter space 46 is to direct hydraulic fluid entering the valve at very high pressures to enter into an interrupter space and then to circulate laterally from the interior toward the exterior of space 46.

In closed mode for PCRS valve 1, piston 13 head 30 cap 32 (supra) is in fluid communication (i.e., through passage 24) with hydraulic fluid in cylinder 103 of cushion device 100 (FIG. 1). The subject piston head design is capable of opening cleanly, i.e., without valve chatter at preset coupler forces, e.g., of about 50,000 pounds or about 70,000 pounds or about 100,000 pounds. The function of the respective piston head portions is disclosed further below.

In a preferred embodiment, piston head is integral with a cylindrical piston rod 31. Rod 31 has on its lower lateral portion a recess 37 for receiving seal 28, e.g., an O-ring. Piston rod base 35 forms a movable upper boundary of dashpot 26; having at its rod center piston passage 33. Hydraulic fluid flowing through passage 33 applies pressure within dashpot 26 that biases the piston rod base 35 (and piston 13) toward valve seat 12. Piston rod base 35 is preferably flat, with about a 45-degree chamfer into piston passage 33, although conical and other shapes that minimize turbulence in dashpot 26 may also be acceptable.

Figure 6:
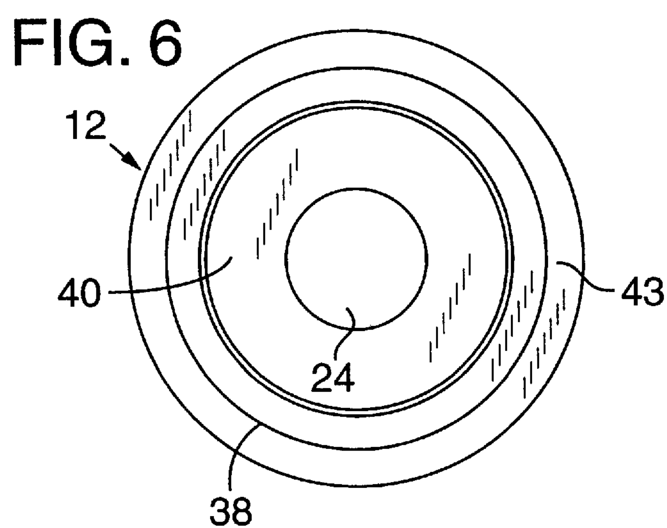
FIG. 6 depicts a plan view of the interior surface of a valve seat plate in the preload valve of FIGS. 3A–3E and FIGS. 5A–5B, above.

FIG. 6 depicts a plan view of the interior surface of the valve seat plate 12 of FIGS. 3A–3D, above.

Valve seat passage 24 is aligned to coincide with aperture 107 in cylinder wall 103 (FIGS. 1–2) and with piston head cap portion 32 and channel 33 (FIGS. 3A–3E, 4A–4B, above). The slope of tapered plane portion 34 of the piston head 30, and the size and orientation of convex passage portions 36 were found effective to cleanly direct high pressure hydraulic fluid flow to the radial periphery of the piston, around the edge of the piston head and down spring orifice 22; with minimal turbulence and without piston valve chatter.

Figure 7A:
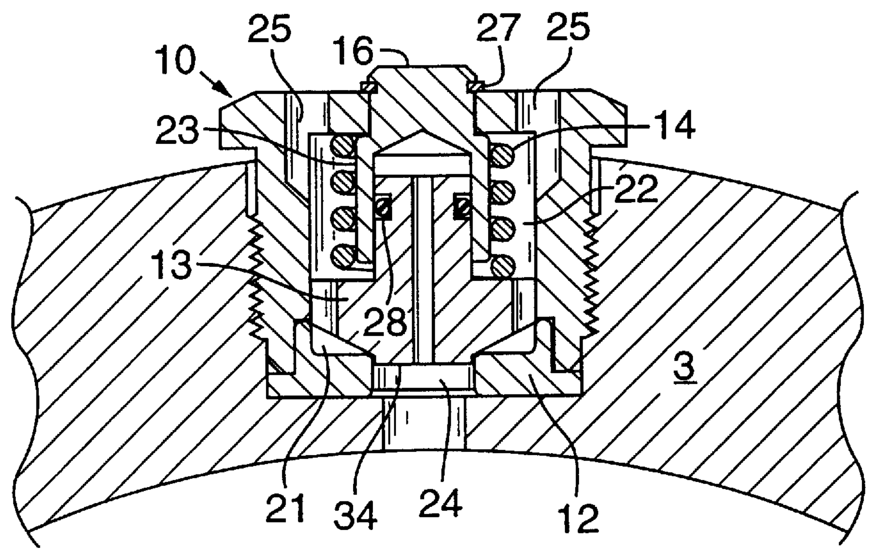
FIG. 7A depicts a side cross-sectional view of the PCRS valve of FIGS. 3A–3B in closed mode.

FIG. 7A depicts PCRS valve 1 of FIGS. 3A–3B in closed mode.

Figure 7B:
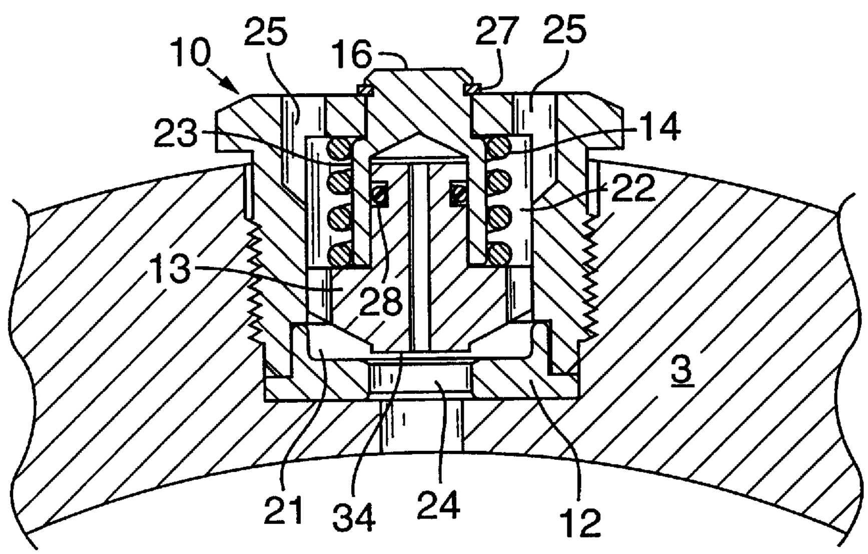
FIG. 7B depicts a side cross-sectional view of the PCRS valve of FIGS. 3A–3B in open mode.

FIG. 7B depicts PCRS valve 1 of FIGS. 3A–3B in open mode.

Figure 7C:
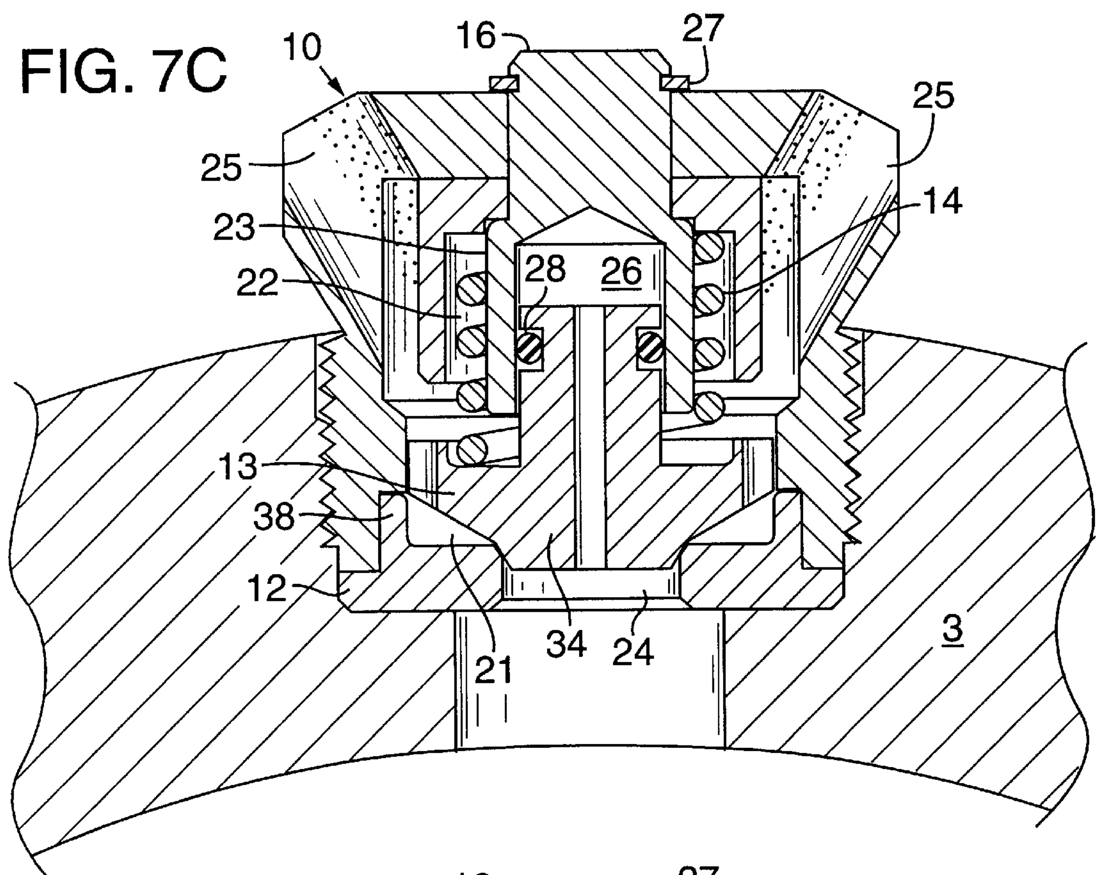
FIG. 7C depicts a side cross-sectional view of the PCRS valve of FIGS. 3C–3E in closed mode.

FIG. 7C depicts PCRS valve 1 of FIGS. 3C–3E in closed mode.

Figure 7D:
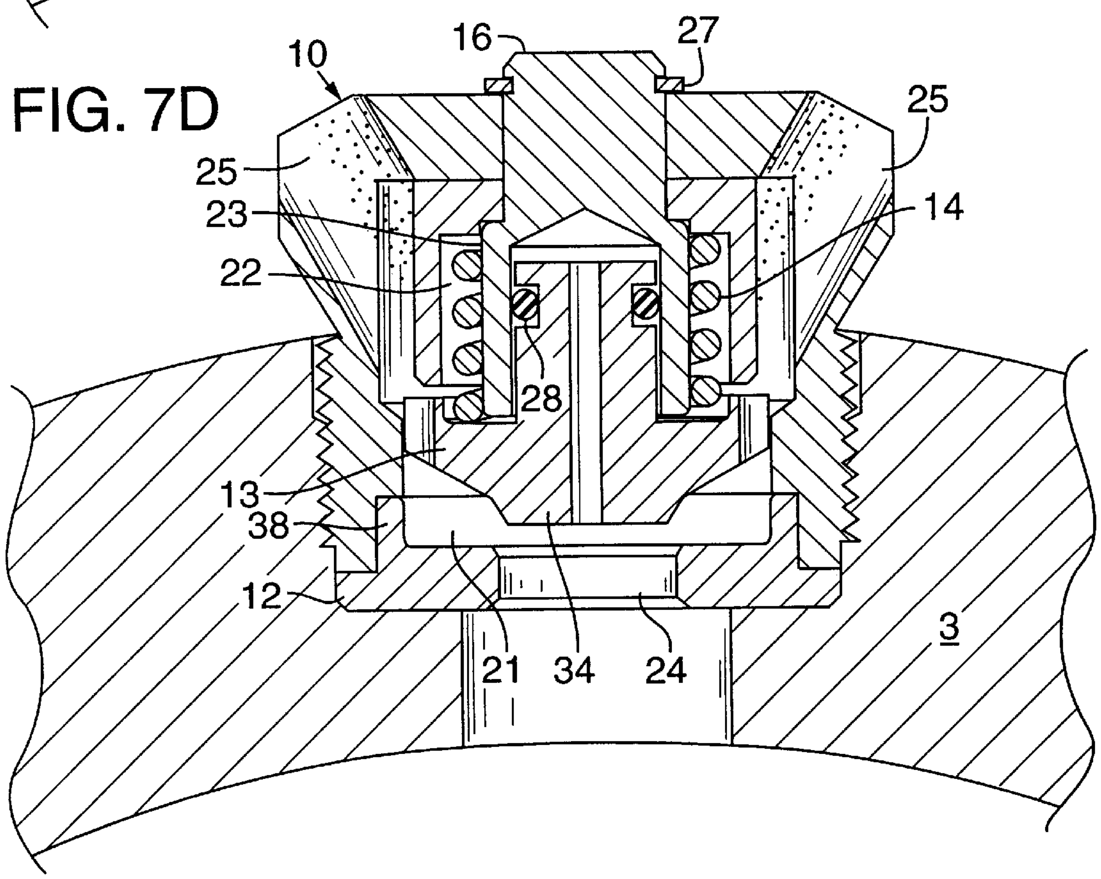
FIG. 7D depicts a side cross-sectional view of the PCRS valve of FIGS. 3C–3E in open mode.

FIG. 7D depicts PCRS valve 1 of FIGS. 3C–3E in open mode.

Referring to the passage of hydraulic fluids through valve housing 10, when the valving means is in a “closed” mode (FIG. 7A) the entry of fluid is partially restricted by the head cap 32 of valve piston 13. However, fluid is able to flow through passage 33 in valve piston 13 into dashpot 26. Valve piston 13 is retained against valve seat plate 12 by reset spring 14 and by the pressure from hydraulic fluid flowing into dashpot 26.

In “open” mode (FIGS. 7B; 7D), fluid from cushion device 100 enters valve housing 10 through aperture 107 in cylinder wall 103 of cushion device 100 (FIGS. 1–2).

Aperture 107 is in fluid communication with valve seat plate passage 24. In closed mode (FIG. 7A), passage 24 is in communication with piston head cap 32 (FIGS. 3A; 3C.) In open mode (FIG. 7B), passage 24 is in communication with piston head cavity 21 (FIGS. 3A; 3C.) In open mode, valve piston 13 has a number of peripheral radial convex passage portions 36, preferably at least four, (FIGS. 5A; 5B), and most preferably eight (FIGS. 5C; 5D), through which fluid can escape, i.e., around the periphery of piston head 30 into spring orifice 22 (FIGS. 3A; 3C.) Spring orifice 22 is in fluid communication with a number of exit passages 25 leading to the circumferential annular space 106 in cushion device 100 (FIGS. 1–2.) The number and location of exit passages 25 may vary depending upon intended use of the instant PCRS valve in a cushion device (e.g., dependent upon at least the desired preset pressure value, the number of valves to be used in a cushion device and the intended load range of the railcar into which the cushion device is to be installed and the predetermined AAR preload value desired for that railcar.) In one embodiment (FIGS. 3A–3B, supra) six exit passages 25 are radially arranged (FIG. 4A) in housing base 18. In a presently most preferred embodiment, six exit passages 25 are provided (FIGS. 3C–3E; FIG. 5B), allowing hydraulic fluid to pass diagonally through housing 10 to the exterior surface of hex head facet faces 52 in the base 18 of valve housing 10. In the embodiment of FIGS. 3C–3E, exit passages 25 communicate with the apical portion of spring orifice cavity 22. In the embodiment of FIGS. 3A–3B, exit passages 25 communicate with the basal portion of spring orifice cavity 22.

Referring to FIGS. 7A–7D, the following discloses a presently preferred method by which the instant PCRS valve operates to accomplish the objects of the invention, In closed mode, head portion 30 of piston 13 is biased against the interior surface of valve seat 12 (FIGS. 3A–3E; FIG. 6) by 14 and hydraulic pilot cylinder means operative through piston passage 33. It is preferred that the hydraulic pilot bias cylinder shall force the piston against its seat, i.e., valve seat plate 12 until a preset preload pressure value is reached within bore 104 of cushion device 100. When hydraulically biased against seat 12, valve piston 13 is effective to restrict the flow of hydraulic fluid through passage 24. As PCRS valve 10 transitions from closed mode to open mode, valve piston 13 moves from an apical position toward a basal position, i.e., in the direction of housing base 18. As piston 13 moves from closed to open, piston head cavity 21 increases toward a maximal size allowing access of hydraulic fluid to radial piston convex passages 36. The subject fluid flows down the tapered plane 34 portion of piston 13 (FIGS. 3E; 5B), or into interrupter space 46 (FIGS. 5C; 5D), then through passages 36 and around the periphery of piston head 30. The subject transiting fluid gains access to spring orifice 22 and exits valve housing 10 at housing exit passages 25 located either at the base of spring orifice 22 (FIGS. 3A–3B; FIG. 4A). Alternatively, in a presently most preferred embodiment, the subject fluid gains entrance to exit passages 25 at the apical portion of spring orifice 22 with exit from the valve being at six passages in hex facet faces 52 of base 18. Apical entry to passages 25 is presently preferred to (a) reduce the hydraulic forces applied to reset spring 14, and (b) to decrease possible turbulence that might occur at high pressures within spring orifice 22. In a presently preferred embodiment housing 10 contains six exit passages 25 (FIGS. 4A; 4B), although other numbers and sizes of exit passages are envisaged and considered to fall within the scope and spirit of the instant invention.

In preferred embodiments of the invention, hydraulic pilot cylinder means is selected such that at a predetermined preset preload hydraulic pressure value PCRS valve 1 transitions from closed mode to open mode. The actions of the hydraulic pilot cylinder means functions to (i) reduce valve chatter (as defined supra); (ii) extend life of reset spring 14; (iii) assure clean (i.e., non-turbulent) opening of valve 1 by smooth withdrawal of piston head cap portion 32 from valve seat 12; and, achieve full unrestricted flow of hydraulic oil through the PCRS valve. In a presently most preferred embodiment piston 13, depicted FIGS. 5C–5D, has a head portion 30 with interrupter space 46. Interrupter space 46 is of such a design that the fluid flow into this space is effective to maintain an opening force on the PCRS valve 1 piston 13 and maintain the valve in an open position until the flow rate (and corresponding pressure) drops to a preset value in the cushion device cylinder bore 104, i.e., preferably about 200 psi to about 600 psi and most preferably about 500 psi. Embodiments having the subject piston 13 having interrupter space 46 (FIGS. 5C–5D) are more effective at maintaining the PCRS valve in an open position without chatter during high impact collisions (e.g., 10–14 MPH) than those having a piston according to FIGS. 3A–D (FIGS. 5A–B). Under less challenging operating conditions (e.g., less than about 8 MPH to about 10 MPH) the embodiment of FIG. 3D performs somewhat better than that of FIGS. 3A–B, but at lower speed (e.g., 0–3 MPH and/or lower loads all three embodiments perform somewhat similarly.

In presently preferred embodiments, the AAR predetermined preset coupler force values for transitioning from the PCRS closed mode to open mode is about 50,000 pounds, or about 70–75,000 pounds, or about 100,000 pounds for a cushion device 100 having a piston 106 diameter of about 8-inches to about 11-inches and a stroke of about 10 to about 15 inches. Skilled artisans will recognize that alternative embodiments of the instant preload value may be fabricated to conform with different AAR predetermined preload values, e.g., according to proportional structural modifications suggested by and deriving from Formula I, above.

In regard to preferred conformations of cylinder wall 103 in cushion device 100 (FIG. 1), TABLE 1 (below) discloses dimensions and shapes for machining of aperture 107, cavity 108, and step 111 in presently preferred, and most preferred, embodiments of the invention useful in cushion devices 100 having piston diameters of about 8 inches to about 11 inches and strokes of about 10 inches to about 15 inches.

TABLE 1

| | | Preferred Cylinder Wall 103 Receptacle Dimensions | | | |
|---|---|---|---|---|---|
| | Preferred | Preferred Dimensions (inches)* | | Most Preferred Dimensions (inches)* | |
| Element | Shape | Diameter | Length | Diameter | Length |
| Aperture 107 | cylindrical void | about 5/16 to about 3/8 | about 1/4 to about 7/16 | about 0.349 to about 0.375 | about 0.248 to about 0.252 |
| Cavity 108 | cylindrical void | about 3/4 to about 1 1/2 | about 3/4 to about 7/8 | about 1.115 to about 1.243 | about 0.821 to about 0.816 |

TABLE 1-continued

| Preferred Cylinder Wall 103 Receptacle Dimensions | | | | | |
|---|---|---|---|---|---|
| | Preferred | Preferred Dimensions (inches)* | | Most Preferred Dimensions (inches)* | |
| Element | Shape | Diameter | Length | Diameter | Length |
| Step 111 | circular ring with center void | about 5/16 to about 7/16 | NA | about 0.315 to about 0.433 | NA |

*NA, not applicable

TABLE 2 discloses the presently preferred dimensions for a PCRS valve 1 suitable for installation in a cylinder wall 103 cavity 108 having the dimensions according to TABLE 1 (above).

TABLE 2

| Preferred PCRS valve 1 Dimensions | | | | | |
|---|---|---|---|---|---|
| | Preferred | Preferred Dimensions (inches)** | | Most Preferred Dimensions (inches)* | |
| Componen | Shape* | Diameter | Length | Diameter | Length |
| Housing 10 | cylindrical | about 1.115 to about 1.243 | about 0.821 to about 0.816 | about 1.115 to about 1.243 | about 0.957 to about 1.163 |
| Valve Seat Passage 24 | cylindrical void | about 0.349 to about 0.375 | about 0.273 to about 0.281 | about 0.349 to about 0.375 | about 0.273 to about 0.281 |
| Piston head 30 | SID | about 0.800 to about 0.803 | about 0.304 to about 0.307 | about 0.872 to about 0.876 | about 0.356 to about 0.361 |
| Piston cap 32 | cylindrical filled; SID | about 0.361 to about 0.363 | about 0.123 to about 0.127[a] | about 0.333 to about 0.469 | about 0.146 to about 0.149[b] |
| Piston passage 33 | cylindrical void; SID | about 0.062 to about 0.065 | about 0.689 to about 0.692 | about 0.060 to about 0.064 | about 0.675 to about 0.680 |
| Piston rod 31 | cylindrical solid | about 0.336 to about 0.338 | about 0.384 to about 0.389 | about 0.342 to about 0.344 | about 0.333 to about 0.338 |
| Piston biasing chamber 26 | cyl. void; conical apex | about 0.339 to about 0.341 | about 0.397 to about 0.400 | about 0.343 to about 0.347 | about 0.473 to about 0.477 |
| Housing body exit passage 25 | round void; SID | about 0.153 to about 0.159 | NA | about 0.320 to about 0.310 | NA |

*SID, complex shape, see accompanying instant disclosure;
** NA, not applicable;
[a]according to FIG. 3D; 5B;
[b]according to FIG. 5C–5D.

The preferred and most preferred embodiments of PCRS valve 1, having dimensions as disclosed in TABLE 2 (above), is further capable of providing to the cushion device a preload of about 50,000 pounds, or about 70,000 pounds, or about 100,000 pounds. Additional dimensions are as follows: namely, In the preferred embodiment (FIGS. 3D; 5B), piston head plane portion 34 forms about a 30-degree to about a 32-degree inclined plane, preferably about 30 to about 31-degrees, relative to the flat surface of piston head 30 cap 32. Plane portion 34 starts at about the middle of the radial edge of piston head 30 and extending to piston head cap portion 32. Preferably plane portion 34 starts about 0.155-inches from the base of the piston head and about 0.149-inches from piston cap 32; and, Each radial piston head convex passage 36 subscribes an arc of a circle having a radius of about 5/32-inch to about 6/32-inch, preferably a radius of about 0.156 inches and an arc depth of about 0.084 inches (i.e., the maximal depth cut into piston head 30.) The cross-sectional area relationships between valve seat plate passage 24, piston passage 33, piston biasing chamber 26, interrupter space 46 and piston head convex (scallop) passages 36 are set forth in TABLE 3, below.

TABLE 3

| Preferred Cross-Sectional Area Relationships within PCRS Valve 10 | | | | | | | | | |
|---|---|---|---|---|---|---|---|---|---|
| Passage 24 | | Passage 33 | | Chamber 26 | | Space 46 | | Scallop passages 36 | |
| sq. in. | ratio* | sq. in. | ratio | sq. in. | ratio | sq. in. | ratio | tot. sq. in. | ratio |
| 0.100 | 1.0 | 0.003 | 0.03 | 0.091 | 0.09 | 1.01 | 10.1 | 0.213 | 2.13 |

*Ratio = sq. in./sq. in. of passage 24.

In the most preferred embodiment (FIG. 3D fitted with piston 13 of FIGS. 5C–5D), piston head 30 contains an elevated cap portion 32 and cap wall portion 48 that channels hydraulic fluid under high pressure into interrupter space 46. The function of the latter interior curvature of interrupter space 46 is to direct hydraulic fluid entering the valve at very high pressures to enter into a whirlpool vortex that is circulating from the interior (i.e., toward the valve centerline) toward the exterior in space 46. In a preferred embodiment the radius of curvature of the interior wall of space 46 is about 0.093-inches; the radius of curvature of the exterior wall of space 46 is about 0.033-inches; and, space 46 is about 0.211-inches deep, about 0.308-inches to about 0.312-inches wide, and has a exterior diameter of 0.720-inches. In the latter embodiment, cap rim 47 is about 0.1 54-inches wide and has a tapered edge forming an angle of about 30-degrees relative to the horizontal axis of piston 13. Interrupter space 46 as configured with the ratios set forth in TABLE 3, is effective once the PCRS valve is in the open position with hydraulic oil flow resulting from a cushion device cylinder bore 104 pressure of about 500 psi, to exert an opening force of about 15 pounds to about 40 pounds on piston head 30, preferably about 15 to about 30 pounds, and most preferably less than about 17 pounds. The force is effective to maintain the valve in the open position until the pressure drops below 500 psi, preferably to about 200 psi to 300 psi, at which pressure the valve closes.

Each of eight radial piston head convex passages 36 (FIG. 5D) subscribes an arc of a circle having a radius of about 5⁄32-inch to about 6⁄32-inch, preferably a radius of about 0.156 inches and an arc depth of about 0.107-inches to about 0.110-inches (i.e., the maximal depth cut into piston head 30.)

In the both the preferred and most preferred embodiments, piston biasing chamber most preferably is polished to a #16 (or better) finish. Spring orifice 22 is preferably a cylindrical void making up an internal cavity area of about 0.515 cubic inches. Interior housing wall 20 is preferably polished to a #16 (or better) finish. Helical compression spring is preferably about 5⁄8 inches in length, preferably about 0.627-inches to about 0.633-inches, most preferably about 0.630-inches; has a diameter of about 11⁄16-inch, preferably about 0.683-inches to about 0.689-inches, most preferably about 0.686-inches; has a bore of about 0.521-inches; has a maximum deflection of about 0.180-inches; has a maximum load of preferably less than about 28 pounds, most preferably about 10 to about 12 pounds; is made up of four coils each having a diameter of less than about 0.082-inches; and, e.g. of a heat treated stainless steel.

The following general relationships set forth in TABLE 4, below, serve as benchmarks in machining of PCRS valves having different predetermined preset pressure preload values, supra.

TABLE 4

Alternative PCRS valve 1 Benchmarks

| Component or Chamber | Preferred Dimensions and Enclosed Hydraulic Fluid Volumes | | | |
|---|---|---|---|---|
| | Radius (inches) | Height (inches) | Volume (cubic inches) | Preferred Volume as Percentage of Housing Interior Volume (%)* |
| Housing 10 interior cavity[a] | about 0.404 to about 0.405 | about 0.629 to about 0.639 | about 0.418 to about 0.423 | 100 |
| Head cavity 21 | SID | SID | about 0.032 | about 7.6 to about 7.7 |
| Spring orifice 22[a,b] | SID | about 0.473 to about 0.477 | about 0.283 to about 0.288 | about 67 to about 69 |
| Dashpot 26[c] | about 0.170 to about 0.171 | about 0.399 to about 0.479 | about 0.029 | about 6.8 to about 6.9 |
| Piston passage 33 | about 0.031 | about 0.689 | about 0.002 | about 0.47 to about 0.5 |
| Piston 13 | SID | SID | about 0.058 | about 13.6 to about 13.8 |
| Spring 14 | SID | SID | about 0.007 | about 1.7 |
| Piston head 30 | SID | SID | about 0.042 | about 9.8 to about 10 |
| Piston rod 31 | about 0.116 | about 0.385 | about 0.016 | about 3.8 |

*SID, complex shape, see accompanying instant disclosure;
[a]volume available to fluid, i.e., with volume occupied by piston subtracted;
[b]volume available to fluid, i.e., with spring volume subtracted;
[c]volume availabe to fluid hen valve in closed mode, i.e., piston rod volume subtracted.

The guidelines in TABLE 4 discloses that a PCRS valve according to the invention will have a piston head cavity 21 that, when in the closed mode (supra), is less than about 7.6–7.7% of the total interior volume of housing 10 that is accessible to hydraulic fluid ($V_{10}$); a spring orifice cavity 22 cavity that is about 67–69% of $V_{10}$ when the valve is in a closed mode(supra; exclusive of volume in exit passages 25); a piston rod receiving chamber/dashpot 26 that, (subtracting out space occupied by piston rod 31, has a dashpot cavity that is about 6.8–6.9% of $V_{10}$; a piston passage 33 that accomplishes hydraulic biasing means and is about 0.47–0.5% of $V_{10}$; a piston 13 that occupies a total volume that is about 13.6–13.8% of $V_{10}$; a piston head portion 30 that occupies a volume that is about 9.8–10% of $V_{10}$; and a piston rod portion 31 that occupies a volume that is about 3.8% of $V_{10}$.

TABLE 5

Alternative PCRS valve 1 System* Benchmarks: Preferred PCRS valve 1 Cross-Sectional Areas as a Percentage of the Total Cross-Sectional Area in PCRS preload valve Housing 10

| Components | Radius (inches)* | Cross-Sectional Area (sq. inches) | Percentage (%) |
|---|---|---|---|
| Interior Housing 10 | 0.201 | 0.507 | 100 |
| Seat entry passage 24 | 0.175 | 0.96 | 19 |
| Piston cap portion 32 | 0.181 | 0.103 | 20 |
| Piston head convex passage 36 | 0.156 | 4*(1/2*(0.076)) = 0.152 | 30 |
| Piston passage 33 | 0.031 | 0.003 | 0.6 |
| Spring Orifice 22 | SID | 0.334 | 66 |
| Exit passage 25 | about 0.078 to about 0.151 (SID) | 6(0.019) = 0.115<br>6(.072) = 0.429 | 23<br>NA** |

*SID, complex shape, see accompanying instant disclosure;
NA**, in relation to most preferred embodiment of FIG. 3C–3E not applicable, i.e., complex shape; exit passage not included in calculation of total cross-sectional area.

The guidelines in TABLE 5 discloses that a PCRS valve according to the invention will have a fluid entry passage 24 that is about 19% of the total interior housing 10 cross-sectional area ($XSA_{10}$); a piston cap portion 32 sealing the entry that is about 20% of $XSA_{10}$; several (most preferably four) piston head passages 36 that, when in open mode, allow passage of fluid and have a combined (additive) cross-sectional area that is about 30% of $XSA_{10}$; a piston passage 33 that accomplishes hydraulic biasing means and is about 0.6% of $XSA_{10}$; a spring orifice 22 chamber allowing flow of hydraulic fluid toward an exist, and having a cross-sectional area that is about 66% of $XSA_{10}$ (exclusive of exit passages 25); and, exit passages 25 for fluid that is at least about 23% of $XSA_{10}$.

As an example of how TABLES 3–6 may be used as benchmarks according to the instant disclosure, a cushion device having a piston diameter of 15-inches and stroke of 10-inches would have a cylinder bore 104 with a volume of 1766 cubic inches according solution of the formula for a cylinder: namely, $$V=\pi r^2 h \quad \text{[Formula III]}$$

wherein "r" is the radius of piston 106, "h" is the stroke of the piston in cylinder bore 104 and "V" is the volume of fluid being displace through the instant preload valving system. Accordingly, the total housing 10 volume needed to accomplish a preload value of about 50,000 to 100,000 in the 15-inch diameter cushion device would be about 0.59% to 0.94% (TABLE 5) of 1766 cubic inches, or about 10.4 to about 16.6 cubic inches. If each individual PCRS valve 1 encloses (within its housing 10) a volume of 0.418 cubic inches to 0.423 cubic inches (TABLES 3–5) then a total of about 25 to about 40 individual PCRS valves 1 would be required to constitute a preload valving system if each valve had a diameter of about 1 inch. Proportionately increasing the size of all the components (according to TABLES 1–5) of the valve to a PCRS valve 10 having an overall diameter of about 2-inches would reduce the number of required valves by a factor of two, i.e., about 13 to about 20 valves would constitute a preload valving system for the illustrative 15-inch cushion device. However, it should be noted that when comparing a 10-inch cushion device with a 15-inch, the 15-inch unit will develop about 67% of the hydraulic pressure at the same collision speed as a 10-inch unit (e.g., according to Formula I, above). Thus, a preload valving system for a 15-inch unit that will reasonably mimic the collision test performance of a 10-inch unit and will consist of: 67% of 25–40 valves, or 17–27 individual valves. Each of the individual valves in the subject preload valving system will have internal components with interior fluid volume spaces according to TABLE 3 and cross-sectional areas disclosed in TABLE 4 (and accompanying disclosure), and subassembly components occupying volumes as disclosed in TABLE 5 (and disclosure supra).

TABLE 6

Alternative PCRS valve 1 System* Benchmarks: Preferred PCRS valve 1 Interior Chamber Volumes as a Percentage of Cushion Device 100 Bore 104 Volume

| | Preferred Dimensions and Enclosed Hydraulic Fluid Volumes | | | |
|---|---|---|---|---|
| Component or Chamber | Radius (inches) | Height (inches) | Fluid Volume* (cubic inches) | Percentage (%)* |
| Cylinder Bore 104 | about 4 to about 5 | about 10 | about 502 to about 785 | 100 |
| Housing 10 interior cavity | about 0.404 to about 0.405 | about 0.621 to about 0.629 | 11(0.418 − 0.423) = about 4.6 to about 4.7 | about 0.59 to about 0.94 |
| Head cavity 21 | about 0.404 to about 0.405 | SID | about 11 × (0.032) = 0.352 | about 0.04 to about 0.07 |
| Spring orifice 22 | SID | about 0.473 to about 0.477 | 11 × (0.283 to 0.288) = about 3.11 to 3.17 | about 0.4 to about 0.63 |
| Dashpot 26 | about 0.170 to about 0.171 | about 0.473 to about 0.477 | about 11(0.029) = 0.319 | about 0.04 to about 0.06 |
| Piston passage 33 | about 0.031 | about 0.689 | about 11(0.002) = 0.022 | about 0.003 to about 0.004 |

*System, a preload valving system according to this illustration includes eleven individual PCRS preload valves - according to TABLE 3-4, above- and installed within cylinder wall 103 of single cushion device system 100;
**SID, complex shape, see accompanying instant disclosure.

Turning next to the spike control (SC) valve components of the instant cushion device valving systems.

Figure 8:
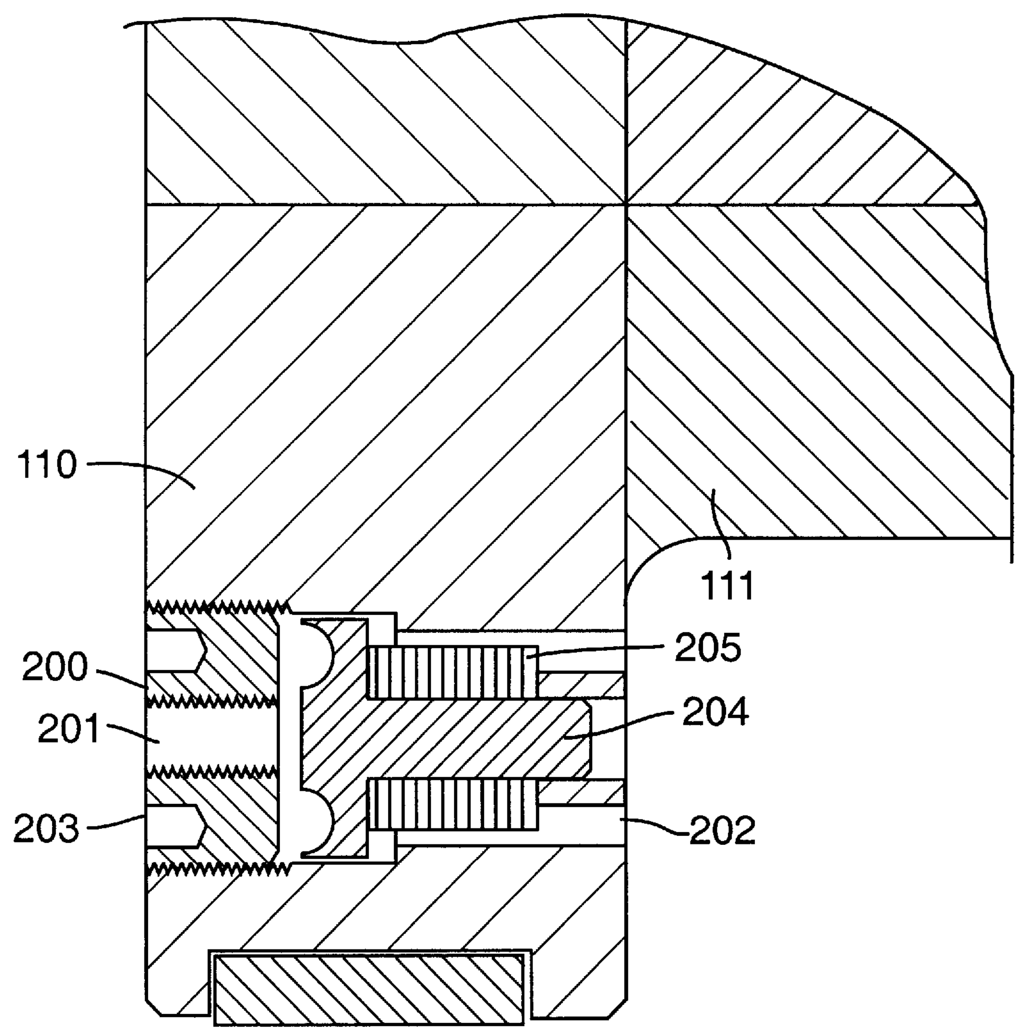
FIG. 8 depicts a partial side cross-sectional view of a cushion device piston having a cavity in which is mounted an SC valve, according to the accompanying disclosure.

FIG. 8 depicts a partial side cross-sectional view of a cushion device piston 105 having shaft 111 and piston head 110 in which a blind cavity has been bored with 6 exhaust holes, and in which threads have been cut to receive and retain SC valve 200. SC valve 200 consists of threaded seat/retainer 203, piston shaft 204, disk spring 205 and piston head 205. Hydraulic oil enters the valve through inlet passage 201 and exhausts through six passages 202. FIG. 8 depicts the valve in the open position.

Figure 9:
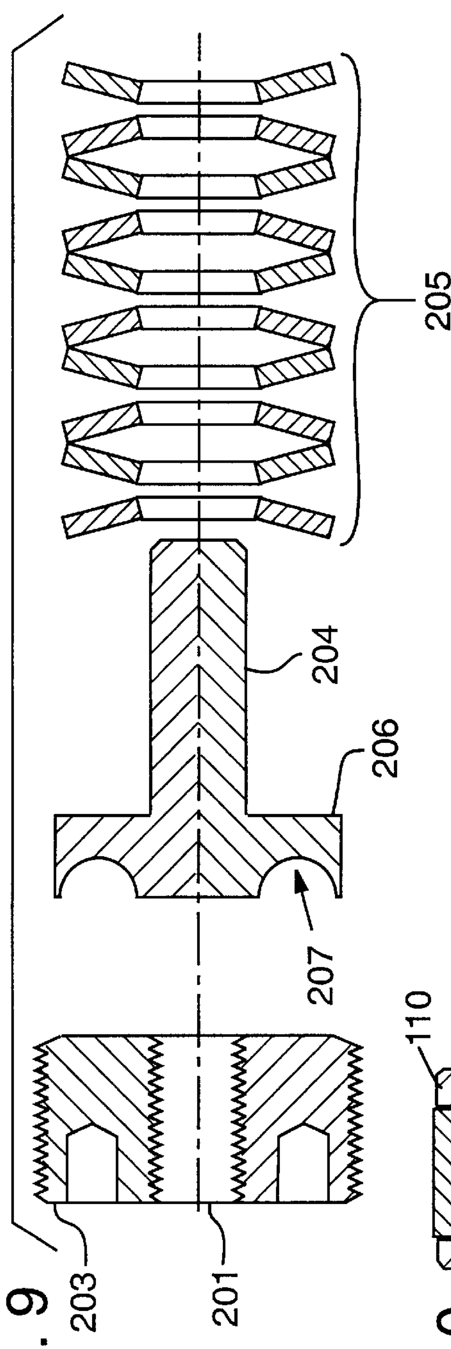
FIG. 9 depicts a cross-sectional exploded view of a the elements of an SC valve, according to the accompanying disclosure.

FIG. 9 depicts a cross-sectional exploded view of a the elements of SC valve 200. Valve 200 is assemble in a cavity in piston head 100 in the following manner: first, disk spring 205 is inserted into the cavity; next, piston shaft 204 is inserted; and finally threaded seat/retainer 203 is inserted, compression applied and seat/retainer 203 turned until its threads 209 (FIG. 11) engage and are retained by the threads in the piston cavity. Piston head 206 has an annular head recess 207, which is capable of actuating the valve to open as disclosed further below.

Figure 10:
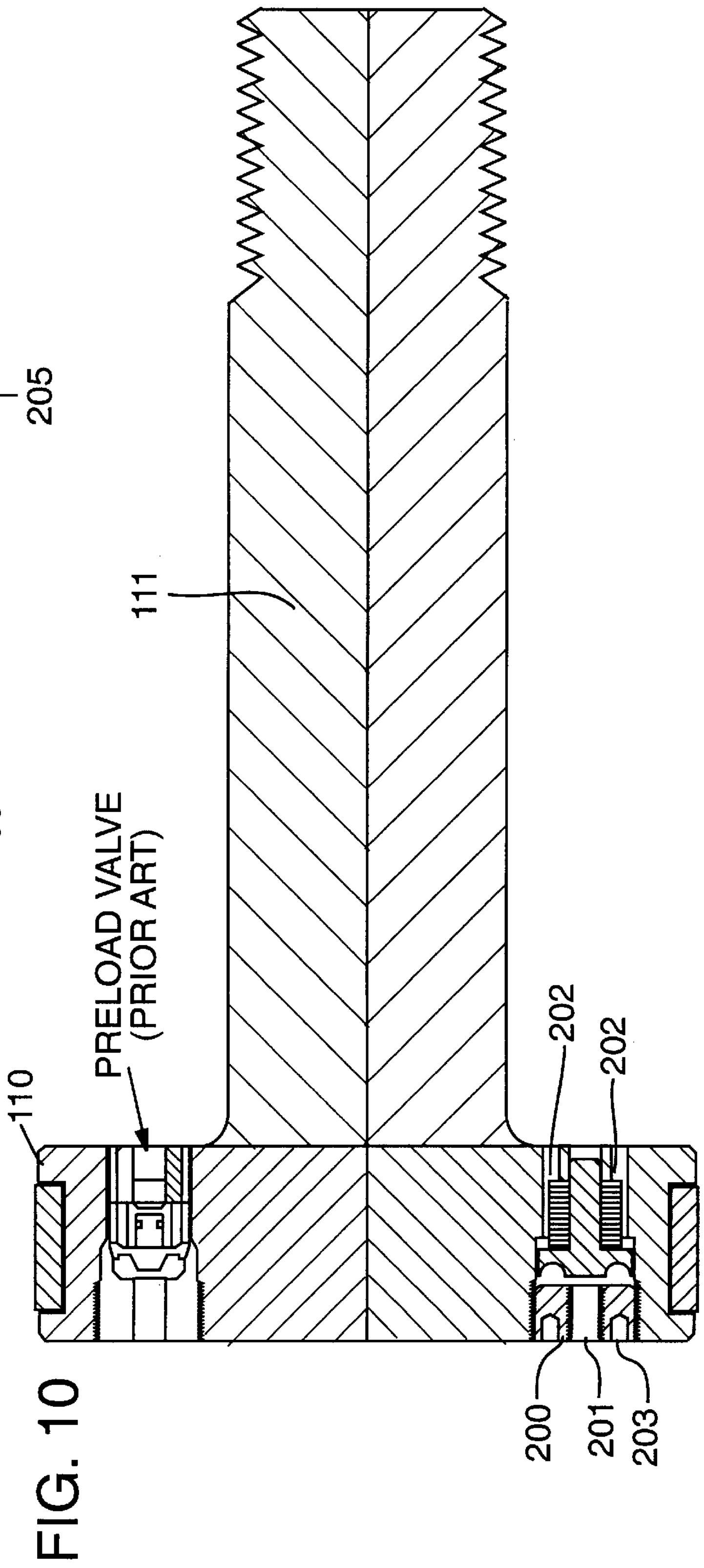
FIG. 10 depicts a side cross-sectional view of a cushion device piston having a cavity in which is mounted an SC valve, according to the accompanying disclosure, and another cavity in which is mounted a preload valve known in the prior art.

FIG. 10 depicts a side cross-sectional view of cushion device piston head 110 in which is mounted SC valve 200. Piston head 110 also has mounted therein a preload valve of a common type known in the art (Preload Valve, Prior Art).

Figure 11:
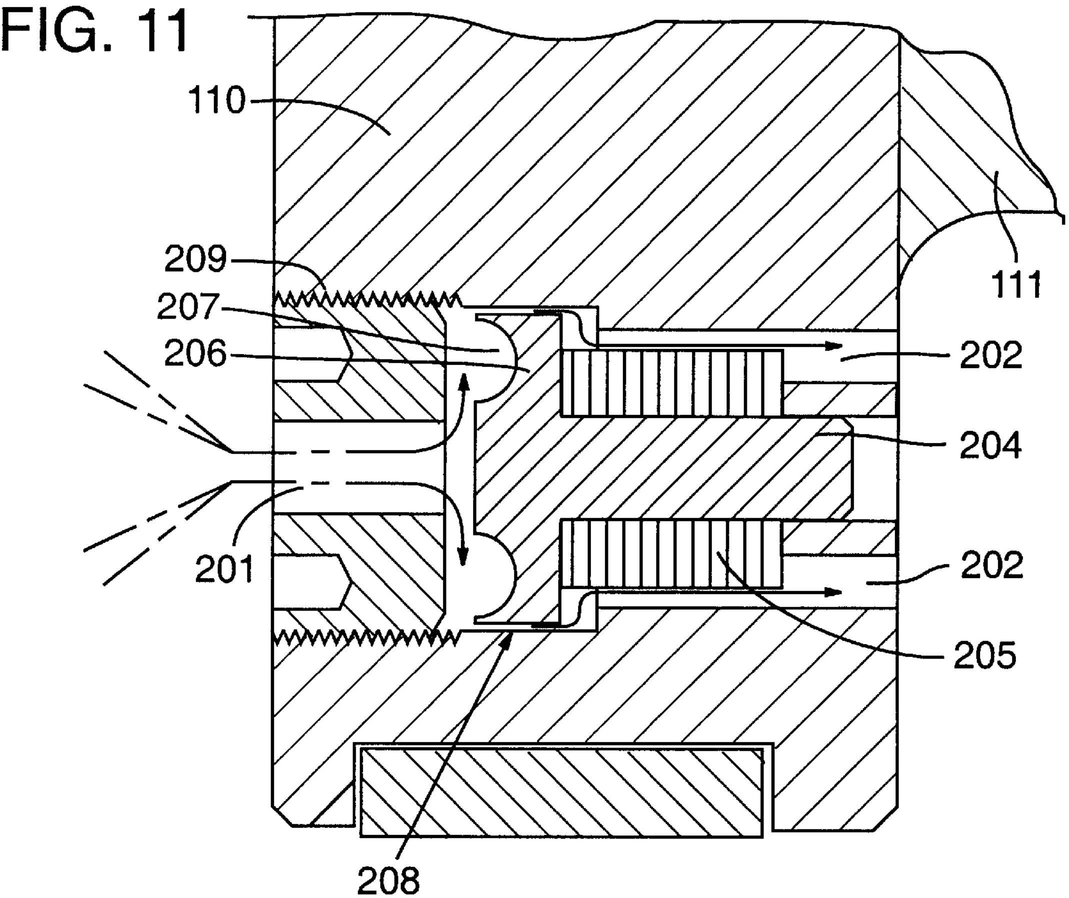
FIG. 11 depicts a partial side cross-sectional view of a cushion device piston head having a cavity in which is mounted an SC valve, according to the accompanying disclosure.

FIG. 11 depicts a partial side cross-sectional view of a cushion device piston head 110 having blind cavity 208, threads 209 for receiving threads on seat/retainer 203, exhaust passages 202, a sleeve for receiving piston shaft 204, and a seat for receiving disk spring 205. SC valve 200 is depicted in an open position (i.e., responsive to a spike pressure) and the flow of hydraulic oil is indicated by arrows, i.e., into inlet 201, into head recess 207, around piston head 206 and spring 205 and out exhaust passage 202 into cushion device circumferential annular space 106. SC valve 200 is caused to open as the flow of hydraulic oil at spike pressures, i.e., as cushion device piston 105 travels about the first ⅛-inch along its stroke, in annular head recess 207 exerts a force of sufficient magnitude to effect a transient opening of the SC valve and a release of a predetermined amount of oil, i.e., about 1 to about 10 ounces, preferably about 2 to about 3 ounces, thereby removing spike pressure.

FIG. 12 depicts a rear view of a cushion device piston head 110 having six exit passages 202 for SC valve 200, and passages for a preload valve such as one known in the art.

APPENDIX A ASSOCIATION OF AMERICAN RAILROADS SPECIFICATION M-921B-96 END-OF-CAR CUSHIONING DEVICES FOR FREIGHT CARS Adopted: 1989; Revised 1996 Draft: Sep. 20, 1996

1.0 SCOPE 1.1 Freight Car Application

This specification covers the design characteristics, sturdiness and testing requirements of end-of-car cushioning devices for approval by the AAR for application to center sills of freight cars. The devices specified herein are acceptable for freight cars weighing between 180,000 pounds gross rail load and 315,000 pounds gross rail load, unless otherwise specified in the application for certificate of test approval.

1.2 Approval

Approval of a design applies only to the applicant and is not transferable without the express written consent of the AAR Coupler and Draft Gear Working Committee. Approval applies only for the buff travel/capacity combination stipulated in the application, Appendix A, Paragraph 2.

2.0 DRAWINGS, ENGINEERING DATA AND SPECIFICATIONS 2.1 Drawings and Specifications The applicant shall furnish complete drawings and specifications in accordance with Appendix A, Paragraph 3. Thereafter, no changes in design, material or performance shall be permitted until the provisions of Paragraph 9.3.2 have been satisfied.

2.2 Static Closure and Return Data

A static closure curve, based on tests, shall be provided for the cushioning device. This shall specify the initial (starting) force and the required force at quarter, half, three-quarter and full travel displacement positions. A nominal return curve from the fully compressed position to the neutral position under return force means shall be provided in the form of a plot of device displacement versus time.

2.3 Train Line Mounting Arrangement

A train line mounting arrangement drawing in accordance with AAR Standard S-4003 or S-XXXX shall be provided.

3.0 GENERAL DESIGN REQUIREMENTS 3.1 Structural Performance

Each cushioning device must meet the specified requirements and be tested according to section 4.0

3.2 Train Action

Each cushioning device must meet the specified requirements and be tested according to Section 5.0.

3.3 Impact Performance

Each cushioning device must meet the specified requirements and be tested according to Section 6.0.

3.4 Train Line Mounting Arrangement

The train line mounting arrangement shall meet the requirements of AAR Standard S-4003 or S-XXXX.

3.5 Ambient Temperature

The cushioning device must be designed to provide performance in the temperature range of −40° F. to 150° F.

3.6 Cushioning Device Status Indication

The cushioning device shall incorporate an external provision to aid in the evaluation of cushioning device status and whether it is functionally acceptable to remain in service. Such provision shall permit evaluation of cushioning device status without removal of the device from the freight car.

3.7 Device Restoration

The cushioning device may use any suitable and reliable means to return back to it fully extended (neutral) position from a compressed position. However, external coil springs shall not be used for device restoration.

4.0 STRUCTURAL TESTS 4.1 Sill Loading Test

The Sill Loading Test is a test that produces an impact speed of fourteen (14) miles per hour or a peak coupler force of 1,250,000 pounds at the struck end of the test car. This test may be waived by the AAR Coupler and Draft Gear Working Committee based upon documentation furnished by the applicant.

4.1.1 Sill Loading Test 4.1.1.1 Test Cars for Sill Load Tests 4.1.1.1.1 Hammer Car The hammer car shall be a nominal 70-ton capacity car, loaded to within two (2) percent of 220,000 pounds gross rail load with sand or other granular material, and shall be equipped with AAR Specification M-901E draft gear at the striking end.

4.1.1.1.2 Anvil Car

The anvil car shall be loaded with rigid lading to within two (2) percent of the AAR gross rail line per Appendix A, Paragraph 2, corresponding to the device capacity being tested, and shall be equipped with the applicant's cushioning device at each end of the car.

4.1.1.2 Test Conditions for Sill Loading Tests 4.1.1.2.1 Arrangement

The test cars and consists [sic] shall be arranged as shown . . .

4.1.1.2.2 Back-up Cars

The anvil car shall be coupled to a minimum of four (4) back-up cars loaded to 220,000 pounds gross rail load. Hand brakes shall be applied on all back-up cars in the standing string, and wheel restraints may be applied to the back-up cars. No restraint shall be applied to the anvil car.

4.1.1.3 Sill Loading Test Procedure 4.1.1.3.1 Testing Sequence

The Sill Loading Test shall be conducted before any other performance testing of the applicant's device.

4.1.1.3.2 Impact Procedure

The hammer car shall be impacted into the anvil car beginning at four (4) miles per hour and increasing in two (2) mile per hour maximum increments to a speed of at least fourteen (14) miles per hour or until a peak coupler force of at least 1,250,000 pounds is achieved.

4.1.1.4 Disqualification 4.1.1.4.1 Examination

The device and the test car structure shall be examined after each impact. There shall be no damage to the device or any test car structural component designed or specified by the applicant, or the device is disqualified. Damage shall be considered as that which requires shopping the car for repairs based on best industry practice.

4.1.1.4.2 Deviation from Neutral Position

After each impact, the deviation from fully extended (neutral) position must not exceed 0.5 inches, or the device is disqualified.

4.2 Vertical Load Test 4.2.1 Vertical Load Test Conditions and Procedure

Vertical Load Tests shall be conducted in accordance with the requirements of the Manual of Standards and Recommended Practices, Section C, Part II, Specification M-1001, Chapter 6, Paragraph 6.3.6. This test requirement for the applicant may be waived in whole or in part by the AAR Coupler and Draft Gear Working Committee based upon documentation furnished in the application demonstrating that the affected components are neither designed nor specified by the applicant, or that a structurally identical device has successfully met these requirements.

4.2.2 Disqualification

There shall be no damage to the device or any test car structural component designed or specified by the applicant, or the device is disqualified. Damage shall be considered that which requires shopping the cars for repair based on best industry practice.

5.0 TRAIN ACTION DESIGN REQUIREMENTS AND TESTS 5.1 Design Requirements 5.1.1 Preload The preload is defined as the force necessary to stroke the unit in either buff or draft at specified low velocities described below. The minimum preload is 100,000 pounds and must be developed within the first one-half (0.5) inch of movement.

5.1.2 Draft Train Action 5.1.2.1 Passive Draft Stroke

The device shall provide for a minimum of two (2) to a maximum of four (4) inches of available draft stroke from a partially run-in position. The force required to compress the device from the fully extended position to the partially run-in position shall not exceed 10,000 pounds at a maximum stroke velocity of one-quarter (0.25) inch per second. The partially run-in position is defined as the compressed position established by the device upon application of the low compression force specified above.

5.1.2.2 Alternate to Passive Draft Stroke

As an alternate, devices without provisions for available draft stroke per paragraph 5.1.2.1 shall incorporate design features that will demonstrate equivalent draft train action performance. Such demonstration is the responsibility of the applicant and is subject to AAR approval.

5.1.2.3 Allowable Coupler Force, Draft Train Action

The allowable coupler force while stroking the device in draft, from the partially run-in position, and from the fully compressed position, up to three (3) miles per hour, shall be shown in Paragraph 5.1.4.

5.1.3 Buff Train Action 5.1.3.1 Allowable Coupler Force, Burr Train Action

The allowable coupler force while stroking the unit in buff, from the fully extended (neutral) and one-quarter (0.25) buff travel positions, up to three (3) miles per hour, shall be as shown in Paragraph 5.1.4. One-quarter (0.25) buff travel is defined as the position in the device stroke at which 75 percent of the total device travel has been consumed from the fully extended position.

5.1.4 Allowable Coupler Force, Train Action

The maximum allowable coupler force for Train Action, based on device buff travel, shall be as follows, but shall not exceed 1,250,000 pounds:

| Device Buff Travel, inches | Maximum Coupler Force at 2 MPH ($F_2$) | Maximum Coupler Force at 3 MPH ($F_3$) |
|---|---|---|
| <6.00 | 1.50 W | 2.00 W |
| 6.00 to <9.00 | 1.25 W | 1.75 W |
| 9.00 to <14.00 | 1.00 W | 1.50 W |
| >14.00 | 0.75 W | 1.00 W |

where W = 263,000 pounds gross rail load, unless otherwise speicified, in which case
W = gross rail load for which approval is sought.

The minimum allowable coupler force for Train Action is the Preload force per Paragraph 5.1.1

FIG. 13

5.1.5 Preload Effectiveness

From the partially run-in position, with 100,000 pounds compressive force applied to the device, stroke velocity shall not exceed one-quarter (0.25) inch per second.

5.1.6 Restoring Mechanism Performance

Unit return to fully extended (neutral) position from the fully compressed position shall occur no faster than sixty (60) seconds and no slower than one hundred twenty (120) seconds.

5.2 Train Action Test Requirements 5.2.1 Test Cars for Train Action Tests 5.2.1.1 Hammer Car The hammer car shall be loaded with sand or other granular material, or with rigid lading, to within two (2) percent of the AAR gross rail load per AAR-Appendix A, Paragraph 2, corresponding to the device capacity being tested.

5.2.1.2 Anvil Car

The anvil car shall be loaded with sand or other granular material, or with rigid lading, to within two (2) percent of 220,000 pounds gross rail load.

5.2.1.3 Equipment Installation

The applicant's cushioning device shall be installed in the stuck end of either the hammer car or the anvil car. An AAR Specification M-901E Draft Gear shall be installed in the struck end of the other car, and in the non-struck end of the anvil car.

5.2.2 Test Conditions for Train Action Tests 5.2.2.1 Arrangement

The test cars and consists [sic] shall be arranged as shown . . .

5.2.2.2 Disengagement of Return Means

Cushioning device return means may be disengaged during Train Action Tests at the discretion of the applicant.

5.2.2.3 Back-up Car

The anvil car shall be coupled to one (1) nominal 70-ton capacity car, loaded to within two (2) percent of 220,000 pounds gross rail load with sand or other granular material, with the hand brake on the last car on the non-struck end of the string tightly set. Free slack between cars shall be removed. However, draft gears are not to be compressed. No restraint other than the handbrake on the last car shall be used.

5.2.3 Train Action Test Procedure 5.2.3.1 Impact Speeds

The hammer car shall be impacted into the anvil car at speeds of one (1), two (2) and three (3) miles per hour.

5.2.3.2 Draft Test Positions

In draft tests, the device shall be placed at its partially run-in position, and at its fully compressed position, for each of the test impacts at all three speeds.

5.2.3.3 Buff Test Positions

In buff tests, the device shall be placed at its fully extended (neutral) position, and at one-quarter (0.25) buff travel position, for each of the test impacts at all three speeds.

5.2.3.4 Measurements

All measurements per Section 7.0 are required.

5.2.3.5 Alternate Train Action Test Procedure

The train action tests may be conducted using a hydraulic ram to stroke the unit. The use of a hydraulic ram must simulate each of the impacts required in Paragraph 5.2.3, and is subject to AAR approval.

5.2.4 Additional Tests 5.2.4.1 Run-in Force Test

The cushioning device shall be compressed from the fully extended position to the partially run-in position at a maximum velocity of one-quarter (0.25) inch per second. The force applied to compress the device over this stroke shall be measured.

5.2.4.2 Preload Effectiveness Test

A compressive force of 100,000 pounds minimum shall be applied to the cushioning device. The stroke velocity of the cushioning device from the partially run-in position shall be measured during force application. The test may be stopped after one minute of force application. The stroke velocity and displacement of the cushioning device from the run-in position shall be measured during force application.

5.2.4.3 Restoring Performance Test

The cushioning device shall be fully compressed. Upon removal of the compressing force, the time required for the device to return to it fully extended (neutral) position shall be recorded.

5.2.4.4 Measurements

All applicable measurements per Section 7.0 are required.

5.2.5 Disqualification 5.2.5.1 Minimum Peak Coupler Force

If the measured peak coupler force from Train Action Tests is below the Preload force per Paragraph 5.1.1, the device is disqualified.

5.2.5.2 Maximum Peak Coupler Force

If the measured peak coupler force from Train Action Tests exceeds the maximum force as shown in Paragraph 5.1.4, the device is disqualified.

5.2.5.3 Maximum Run-in Force

If the measured force from the Run-in Force Test exceeds 10,000 pounds at any time over the specified stroke, the device is disqualified. If the device fails to compress to the specified partially run-in position during the Run-in Force Test, the device is disqualified.

5.2.5.4 Maximum Stroke Preload

If the measured stroke velocity from the Preload Effectiveness Test exceeds one-quarter (0.25) inch per second at any time over the specified stroke, the device is disqualified. If the 100,000 pounds is not developed within the first 0.5 inches of movement from the partially run-in position, then the device is disqualified.

5.2.5.5 Restoring Time

If the recorded time from the Restoring Performance Test is below sixty (60) seconds or exceeds one-hundred-twenty (120) seconds, the device is disqualified.

6.0 IMPACT PERFORMANCE DESIGN REQUIREMENTS AND TESTS 6.1 Design Requirements

The maximum allowable coupler force while stroking the device in buff during impacts, from the fully extended (neutral) position, up to ten (10) miles per hour, shall be as follows, but shall not exceed 1,250,000 pounds:

| Device Buff Travel, inches | Maximum Coupler Force at 6 MPH ($F_6$) | Maximum Coupler Force at 10 MPH ($F_{10}$) |
|---|---|---|
| <6.00 | 2.00 W | 5.50 W |
| 6.00 to <9.00 | 1.50 W | 4.00 W |
| 9.00 to <14.00 | 1.25 W | 3.50 W |
| >14.00 | 1.00 W | 2.75 W |

where W = 263,000 pounds, unless otherwise speicified, in which case W = gross rail load for which approval is sought.

FIG. 14

6.2 Test Requirements 6.2.1 Test Cars for Impact Performance Tests 6.2.1.1 Hammer Car The hammer car shall be loaded with sand or other granular material, or with rigid lading, to within two (2) percent of the AAR gross rail load per Appendix A, Paragraph 2, corresponding to the device capacity being tested.

6.2.1.2 Anvil Car

The anvil car shall be loaded with sand or other granular material, or with rigid lading, to within two (2) percent of 220,000 pounds gross rail load.

6.2.1.3 Equipment Installation

The applicant's cushioning device shall be installed in the struck end of either the hammer car or the anvil car. An AAR Specification M-901E Draft Gear shall be installed in the struck end of the other car, and in the non-struck end of the anvil car.

6.2.2 Test Conditions for Impact Performance Tests 6.2.2.1 Arrangement

The test cars and consists shall be arranged as shown . . .

6.2.2.2 Back-up Cars

The anvil car shall be coupled to two (2) nominal 70-ton capacity cars, loaded to within two (2) percent of 220,000 pounds gross rail load with sand or other granular material, with the hand brake on the last car on the non-struck end of the string tightly set. Free slack between cars shall be removed. However, draft gears are not to be compressed. No restraint other than the handbrake on the last car shall be used.

6.2.2.3 Ambient Temperature

The ambient temperature during testing shall be between −30° F. and 105° F.

6.2.3.1 Impact Speeds

The hammer car shall be impacted into the anvil car and standing string beginning at one (1) mile per hour and increasing in one (1) mile per hour increments up to ten (10) miles per hour. Actual impact speed shall be within 0.2 mile [sic] per hour of the required impact speed.

6.2.3.2 Measurements

All measurements per section 7.0 are required.

6.2.5 Disqualification 6.2.5.1 Maximum Peak Coupler Force

If the measured peak coupler force exceeds the maximum force as shown in Paragraph 6.1, the device is disqualified.

7.0 MEASUREMENTS 7.1 Required Measurements

The following measurements are required on the struck end of the test car for all impacts, and for Additional Tests as applicable, of the applicant's cushioning device:

7.1.1 Coupler Force 7.1.1.1 Dynamometer Coupler

A calibrated dynamometer coupler shall be used. The dynamometer coupler may be applied to the struck end of either the hammer car or the anvil car.

7.1.1.2 Load Cell

For Train Action and Additional Tests only, a load cell may be used in lieu of a dynamometer coupler.

7.1.1.3 Calibration

Calibration data shall be furnished for all dynamometer couplers and load cells used during testing, and shall be current within six (6) months of the device testing date.

7.1.2 Cushioning Device Travel

A string potentiometer, slide wire, LVDT, or other suitable means may be used to measure device travel.

7.1.3 Impact Speed

Hammer car speed prior to impact shall be measured within five (5) feet of the point of impact.

7.1.4 Stroke Velocity

A velocity transducer or other suitable means may be used to measure device velocity.

7.2 Instrumentation

The instrumentation used during testing shall meet the requirements of AAR Specification M-901F as applicable.

8.0 TEST REPORT REQUIREMENTS

Official results of the test will be furnished by the AAR Witness to the Coupler and Draft Gear Working Committee for evaluation prior to issuance of Certificate of Test Approval.

APPENDIX B ASSOCIATION OF AMERICAN RAILROADS SPECIFICATION M-921D-96 END OF CAR CUSHIONING DEVICES FOR MOTOR VEHICLE CARRYING FREIGHT CARS Adopted 1993; Revised 1996

1.0 SCOPE 1.1 Freight Car Application

This specification covers the design characteristics, sturdiness, and testing requirements of end-of-car cushioning devices for approval by the AAR for application to center sills of motor vehicle carrying freight cars. The devices specified herein are acceptable for conventional 89 foot bi-level and tri-level autorack cars and other freight cars of 120,000 to 180,000 pounds gross rail load. Cushioning device design buff travel from the neutral position shall not exceed ten (10) inches.

1.2 Approval

Approval of a design applies only to the applicant and is not transferable without the express written consent of the AAR Coupler and Draft Gear Working Committee.

2.0 DRAWINGS, ENGINEERING DATA AND SPECIFICATIONS 2.1 Drawings and Specifications The applicant shall furnish complete drawings and specifications in accordance with Appendix A, Paragraph 3. Thereafter, no changes in design, material or performance shall be permitted until the provisions of Paragraph 9.3.2 have been satisfied.

2.2 Static Closure and Return Data

A static closure curve, based on tests, shall be provided for the cushioning device. This shall specify the initial starting force and the required force at quarter, half, three-quarter and full travel displacement positions. A nominal return curve from the fully compressed position to the neutral position under return force means shall be provided in the form of a plot of device displacement versus time.

2.3 Train Line Mounting Arrangement

A train line mounting arrangement drawing in accordance with AAR Specification S-4003 shall be provided.

3.0 GENERAL DESIGN REQUIREMENTS 3.1 Structural Performance

Each cushioning device must meet the specified requirements and be tested according to Section 4.0.

3.2 Train Action

Each cushioning device must meet the specified requirements and be tested according to Section 5.0.

3.3 Impact Performance

Each cushioning device must meet the specified requirements and be tested according to Section 6.0.

3.4 Train Line Mounting Arrangement

The train line mounting arrangement shall meet the requirements of AAR Specification S-4003.

3.5 Ambient Temperature

The cushioning device must be designed to provide performance in the temperature range of −40° F. to 150° F.

3.6 Cushioning Device Status Indication

The cushioning device shall incorporate an external provision to aid in the evaluation of cushioning device status and whether it is functionally acceptable to remain in service. Such provision shall permit evaluation of cushioning device status without removal of the device from the freight car.

3.7 Device Restoration

The cushioning device may use any suitable and reliable means to return back to it fully extended (neutral) position from a compressed position. However, external coil springs shall not be used for device restoration.

4.0 Sill LOADING TEST 4.1 Sill Loading Test Definition

The Sill Loading Test is a test that produces an impact speed of fourteen (14) miles per hour or a peak coupler force of 1,250,000 pounds at the struck end of the test car. This test may be waived by the AAR Coupler and Draft Gear Working Committee based upon documentation furnished by the applicant.

4.2 Sill Loading Test Requirements 4.2.1 Test Cars for Sill Loading Tests 4.2.1.1 Hammer Car The hammer car shall be a nominal 70-ton capacity car, loaded to within ±2 percent of 220,000 pounds gross rail load with sand or other granular material, and shall be equipped with AAR Specification M-901E draft gear at the striking end.

4.2.1.2 Anvil Car

The anvil car shall be loaded with rigid lading to a minimum of 150,000 pounds gross rail load, and shall be equipped with the applicant's cushioning device at each end of the car.

4.2.2 Test Conditions for Sill Loading Tests 4.2.2.2 Back-up Cars

The anvil car shall be coupled to a minimum of four (4) back-up cars loaded to 220,000 pounds gross rail load. Hand brakes shall be applied on all backup cars in the standing string, and wheel restraints may be applied to the back-up cars. No restraint shall be applied to the anvil car.

4.2.3 Sill Loading Test Procedure 4.2.3.1 Testing Sequence 4.2.3.2 Impact Procedure The hammer car shall be impacted into the anvil car beginning at four (4) miles per hour and increasing in two (2) mile per hour maximum increments to a speed of at least fourteen (14) miles per hour or until a peak coupler force of at least 1,250,000 pounds is achieved.

4.2.4 Disqualification 4.2.4.1 Examination

The device and the test car structure shall be examined after each impact. There shall be no damage to the device or any test car structural component designed or specified by the applicant, or the device is disqualified. Damage shall be considered as that which requires shopping the car for repairs based on best industry practice.

4.2.4.2 Deviation from Neutral Position

After each impact, the deviation from fully extended (neutral) position must not exceed 7.5 percent of design full travel, or the device is disqualified.

5.0 TRAIN ACTION DESIGN REQUIREMENTS AND TESTS 5.1 Design Requirements 5.1.1 Preload The preload is defined as the force necessary to stroke the unit in either buff or draft as specified low velocities as described below. The minimum preload is 50,000 pounds and must be developed within the first one-half (0.5) inch of movement.

5.1.2 Draft Train Action 5.1.2.1 Passive Draft Stroke

The device shall provide for a minimum of two (2) to a maximum of four (4) inches of available draft stroke from a partially run-in position. The force required to compress the device from the fully extended position to the partially run-in position shall not exceed 10,000 pounds at a maximum stroke velocity of one-quarter (0.25) inch per second. The partially run-in position is defined as the compressed position established by the device upon application of the low compression force specified above.

5.1.2.2 Alternate to Passive Draft Stroke

As an alternate devices without provisions for available draft stroke per paragraph 5.1.2.1 shall incorporate design features that will demonstrate equivalent draft train action performance. Such demonstration is the responsibility of the applicant and is subject to AAR approval.

5.1.2.3 Allowable Coupler Force, Draft Train Action

The allowable coupler force while stroking the device in draft, from the partially run-in position, and from the fully compressed position, up to three (3) miles per hour, shall be as shown in Paragraph 5.1.4.

5.1.3 Buff Train Action 5.1.3.1 Allowable Coupler Force, Buff Train Action

The allowable coupler force while stroking the unit in buff, from the fully extended (neutral) one-quarter (0.25) buff travel positions, up to three (3) miles per hour, shall be as shown in Paragraph 5.1.4. One-quarter (0.25) buff travel is defined as the position in the device stroke at which 75 percent of the total device travel has been consumed from the fully extended position.

5.1.4 Allowable Coupler Force, Train Action

The allowable coupler force for Train Action shall be as in . . .

FIG. 15

5.1.5 Preload Effectiveness

From the partially run-in position, with 50,000 pounds compressive force applied to the device, stroke velocity shall not exceed one-quarter (0.25) inch per second.

5.1.6 Restoring Mechanism Performance

Unit return to fully extended (neutral) position from the fully compressed position shall occur no faster than sixty (60) seconds and no slower than one-hundred twenty (120) seconds.

5.2 Train Action Test Requirements 5.2.1 Test Cars for Train Action Tests 5.2.1.1 Test Car Loading The hammer car and the anvil car shall be loaded with sand or other granular material, or with rigid lading. One car shall be loaded to within two (2) percent of 150,000 pounds gross rail load and the other to a minimum of 263,000 pounds gross rail load.

5.2.1.2 Equipment Installation

The applicant's cushioning device may be installed in the struck end of either the hammer car or the anvil car. An AAR Specification M-901E Draft Gear shall be installed in the struck end of the other car.

5.2.2 Test Conditions for Train Action Tests 5.2.2.1 Arrangement

The test cars shall be arranged as shown . . .

5.2.2.2 Disengagement of Return Means

Cushioning device return means may be disengaged during Train Action Tests at the discretion of the applicant.

5.2.2.3 Anvil Car Conditions

The anvil car shall be the standing car, and shall be free to roll (uncoupled to backup string, if any).

5.2.3 Train Action Test Procedure 5.2.3.1 Impact Speeds

The hammer car shall be impacted into the anvil car at speeds of one (1), two (2), and three (3) miles per hour.

5.2.3.2 Draft Test Positions

In draft tests, the device shall be placed at its partially run-in position, and at its fully compressed position, for each of the test impacts at all three speeds.

5.2.3.3 Buff Test Positions

In buff tests, the device shall be placed at its fully extended (neutral) position, and at one-quarter (0.25) buff travel position, for each of the test impacts at all three speeds.

5.2.3.4 Measurements

All measurements per Section 7.0 are required.

5.2.3.5 Alternate Train Action Test Procedure

The train action tests may be conducted using a hydraulic ram to stroke the unit. The use of hydraulic ram must simulate each of the impacts required in Paragraph 5.2.3., and is subject to AAR approval.

5.2.4 Additional Tests 5.2.4.1 Run-in Force Test

The cushioning device shall be compressed from the fully extended position to the partially run-in position at a maximum velocity of one-quarter (0.25) inch per second. The force applied to compress the device over this stroke shall be measured.

5.2.4.2 Preload Effectiveness Test

A compressive force of 50,000 pounds minimum shall be applied to the cushioning device. The stroke velocity of the cushioning device from the partially run-in position shall be measured during force application. The test may be stopped after one minute of force application.

5.2.4.3 Restoring Performance Test

The cushioning device shall be fully compressed. Upon removal of the compressing force, the time required for the device to return to its fully extended (neutral) position shall be recorded.

5.2.4.4 Measurements

All applicable measurements per Section 7.0 are required.

5.2.5 Disqualification 5.2.5.1 Minimum Peak Coupler Force

If the measured peak force from Train Action Tests is below the preload force as shown in Paragraph 5.1.4, the device is disqualified.

5.2.5.2 Maximum Peak Coupler Force

If the measured peak coupler force from Train Action Tests exceeds the maximum force as shown in Paragraph 5.1.4, the device is disqualified.

5.2.5.3 Maximum Run-in Force

If the measured force from the Run-in Force Test exceeds 10,000 pounds at any time over the specified stroke, the device is disqualified. If the device fails to compress to the specified partially run-in position during the Run-in Force Test, the device is disqualified.

5.2.5.4 Maximum Stroke Velocity

If the measured stroke velocity from the Preload Effectiveness Test exceeds one-quarter (0.25) inch per second at any time over the specified stroke, the device is disqualified.

5.2.5.5 Restoring Time

Figure 16:
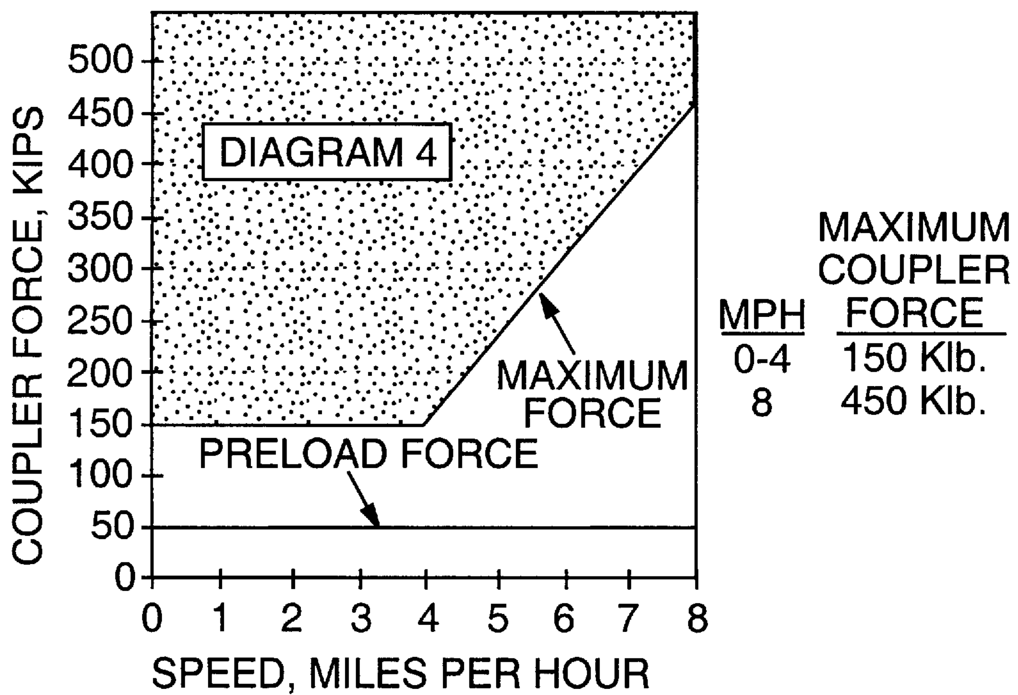
FIG. 16 depicts graphically AAR performance specifications in accord with certification under M-921D-96 and as disclosed further in Appendix B, below.

If the recorded time from the Restoring Performance Test is below sixty (60) seconds or exceeds one-hundred-twenty (120) seconds, the device is disqualified, 6.0 IMPACT PERFORMANCE DESIGN REQUIREMENTS AND TESTS 6.1 Design Requirements The allowable coupler force while stroking the device in buff during impacts, from the fully extended (neutral) position, up to eight (8) miles per hour, shall be as follows: FIG. 16

6.2 Test Requirements 6.2.1 Test Cars for Impact Performance Tests 6.2.1.1 Hammer Car The hammer car shall be loaded with sand or other granular material, or with rigid lading, to within two (2) percent of 150,000 pounds gross rail load.

6.2.1.2 Anvil Car

The anvil car shall be loaded with sand or other granular material, or with rigid lading, to within ±2 percent of 220,000 pounds gross rail load.

6.2.1.3 Equipment Installation

The applicant's cushioning device shall be installed in the struck end of either the hammer car or the anvil car. An AAR Specification M-901E Draft Gear shall be installed in the struck end of the other car, and in the non-struck end of the anvil car.

6.2.2 Test Conditions for Impact Performance Tests 6.2.2.1 Arrangement

The test cars and consists shall be arranged as shown in . . .

6.2.2.2 Back-up Cars

The anvil car shall be coupled to two (2) nominal 70-ton capacity cars, loaded to within two (2) percent of 220,000 pounds gross rail load with sand or other granular material, with the hand brake on the last car on the non-struck end of the string tightly set. Free slack between cars shall be removed. However, draft gears are not to be compressed. No restraint other than the handbrake on the last car shall be used.

6.2.2.3 Ambient Temperature

The ambient temperature during testing shall be between −30° F. and 105° F.

6.2.3 Impact Performance Test Procedure 6.2.3.1 Impact Speeds

The hammer car shall be impacted into the anvil car and standing string beginning at one (1) mile per hour and increasing in one (1) mile per hour increments up to eight (8) miles per hour. actual impact speed shall be within 0.2 mile [sic] per hour of the required impact speed.

6.2.3.2 Measurements

All measurements per Section 7.0 are required.

6.2.5 Disqualification 6.2.5.1 Maximum Peak Coupler Force

If the measured peak coupler force exceeds the maximum force as shown in Paragraph 6.1, the device is disqualified.

6.2.5.2 Deviation from Neutral Position

After each impact, the deviation from fully extended (neutral) position must not exceed 7.5 percent of design full travel, or the device is disqualified.

7.0 MEASUREMENTS 7.1 Required Measurements

The following measurements are required on the struck end of the test car for all impacts, and for Additional Tests as applicable, of the applicant's cushioning device:

7.1.1 Coupler Force 7.1.1.1 Dynamometer Coupler

A calibrated dynamometer coupler shall be used. The dynamometer coupler may be applied to the struck end of either the hammer car or the anvil car.

7.1.1.2 Load Cell

For Train Action and Additional Tests only, a load cell may be used in lieu of a dynamometer coupler.

7.1.1.3 Calibration

Calibration data shall be furnished for all dynamometer couplers and load cells used during testing, and shall be current within six (6) months of the device testing date.

7.1.2 Cushioning Device Travel

A string potentiometer, slide wire, LVDT, or other suitable means may be used to measure device travel.

7.1.3 Impact Speed

Hammer car speed prior to impact shall be measured within five (5) feet of the point of impact.

7.1.4 Stroke Velocity

A velocity transducer or other suitable means may be used to measure device velocity.

7.2 Instrumentation

The instrumentation used during testing shall meet the requirements of AAR Specification M-901F as applicable.

8.0 TEST REPORT REQUIREMENTS

Official results of the test will be furnished by the AAR Witness to the Coupler and Draft Gear Working Committee for evaluation prior to issuance of Certificate of Test Approval.

While the preferred embodiment of the invention has been illustrated and described, it will be appreciated that various changes can be made therein without departing from the spirit and scope of the invention.

I claim:

1. A spike control valve for a hydraulic impact cushioning device having a piston slidingly received within a cylinder containing hydraulic fluid under a pressure, the cylinder having a plurality of apertures for controlling the flow of the hydraulic fluid out of the cylinder when an impact force is applied to the piston, the spike control valve comprising:

- a valve body having a cylinder wall defining a flow passage extending from a passage inlet to a passage outlet;

a first valve seat formed in the cylinder wall near the passage inlet;

a second valve seat formed in the cylinder wall near the passage outlet;

a valve control element slidingly received in the flow passage between the first and second valve seats, the valve control element having a first seat engaging portion and a second seat engaging portion, the valve control element sliding within the flow passage between a first position in which the first seat engaging portion seats against the first valve seat to obstruct hydraulic fluid flow into the flow passage from the passage inlet and a second position in which the second seat engaging portion seats against the second valve seat to obstruct hydraulic fluid flow out of the flow passage via the passage outlet, the valve control element further having recess portions that are recessed relative to the cylinder wall to permit hydraulic fluid flow through the flow passage when the valve control element is between the first and second positions; and a bias element exerting a bias force against the valve control element to urge the valve control element towards the first position whereby a spike in hydraulic fluid pressure at the passage inlet in excess of a spike pressure threshold causes a transient hydraulic fluid flow through the flow passage as the valve control element moves from the first position to the second position.

2. The spike control valve of claim 1 further comprising:

the valve control element having a piston head portion and a rod portion, the piston head portion having a diameter capable of being slidingly received in the flow passage within the cylinder wall; and a rod guide for slidingly receiving the rod portion and guiding sliding movement of the piston head portion within the flow passage.

3. The spike control valve of claim 2 wherein the bias element comprises a plurality of disk springs placed about the rod portion of the valve control element between the piston head portion and the rod guide to exert the bias force axially against the piston head portion.

4. The spike control valve of claim 3 wherein the passage outlet comprises a plurality of exhaust ports circularly arranged about the rod guide.

5. The spike control valve of claim 2 wherein the piston head portion has a recessed face with a seat engaging protrusion, the seat engaging protrusion engaging the first valve seat to block hydraulic fluid flow into the flow passage from the passage inlet when the valve control element is in the first position, the recessed face having an interference recess which in combination with the cylinder wall and first seat define an interruption space for smoothing movement of the valve control element.

6. The spike control valve of claim 1 mounted in a hydraulic impact cushioning device comprising a piston slidingly received within a cylinder containing hydraulic fluid under a pressure, the cylinder having a plurality of apertures for controlling the flow of the hydraulic fluid out of the cylinder when an impact force is applied to the piston, the spike control valve transiently opening in response to the hydraulic fluid pressure in the cylinder spiking above the spike pressure threshold.

7. A railcar cushion device comprising:

a casing having a buff end;

a piston;

a cylinder within the casing such that a circumferential annular space is defined between the casing and the cylinder; said cylinder further having a cylinder wall enclosing a cylinder bore capable of slidably retaining the piston and a hydraulic fluid under a pressure, said cylinder wall having a plurality of apertures for controlling flow of the hydraulic fluid from the cylinder bore into the circumferential annular space when an impact force is applied to move the piston towards the buff end; and a spike control valve operating in response to a pressure spike of the hydraulic fluid in excess of a threshold to open for a transient period releasing a predetermined preset amount of the hydraulic fluid from the cylinder bore between the piston and the buff end.

8. The railcar cushion device of claim 7 wherein the preset amount of the hydraulic fluid is about 1 to about 10 ounces depending upon a speed of impact applied to the piston.

9. The railcar cushion device of claim 7 wherein the spike control valve is mounted in the piston.

10. The railcar cushion device of claim 7 wherein the spike pressure threshold is in a range from about 50,000 pounds to about 100,000 pounds.

11. The railcar cushion device of claim 7 further comprising a plurality of pilot-controlled relief sequence valves mounted in the apertures.

12. The railcar cushion device of claim 7 further comprising a plurality of piston-type, hydraulically biased pilot valves mounted in the apertures.

13. The railcar cushion device of claim 7 further comprising:

a first plurality of preload valves mounted in a first subset of the apertures and having an open mode in which the hydraulic fluid is permitted to flow through the valves and a closed mode in which the hydraulic fluid is stopped from flowing through the valves, the first preload valves being operative to transition from the closed mode to the open mode when the pressure of the hydraulic fluid in the cylinder bore exceeds a first threshold; and a second plurality of preload valves mounted in a second subset of the apertures and having an open mode in which the hydraulic fluid is permitted to flow through the valves and a closed mode in which the hydraulic fluid is stopped from flowing through the valves, the second preload valves being operative to transition from the closed mode to the open mode when the pressure of the hydraulic fluid in the cylinder bore exceeds a second threshold greater than the first threshold;

whereby the railcar cushion device generates a variety of different response profiles at different impact speeds.

14. The railcar cushion device of claim 7 further comprising a plurality of pilot-controlled relief sequence valves operative to open at different preset preload pressures, the pilot-controlled relief sequence valves being mounted in the apertures such that the pilot-controlled relief sequence valves release hydraulic fluid at progressively greater pressures causing the resistive force against the piston to increase in a stepwise manner as the piston traverses the cylinder towards the buff end.

* * * * *